(12) United States Patent  
Ooe

(10) Patent No.: US 8,856,810 B2  
(45) Date of Patent: Oct. 7, 2014

(54) INFORMATION PROCESSING SYSTEM CONFIGURED TO EMULATE SOFTWARE DURING AN EMULATION MODE

(75) Inventor: Tooru Ooe, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1171 days.

(21) Appl. No.: 12/073,564

(22) Filed: Mar. 6, 2008

(65) Prior Publication Data

US 2009/0217307 A1 Aug. 27, 2009

(30) Foreign Application Priority Data

Feb. 27, 2008 (JP) ................................ 2008-046849

(51) Int. Cl.
  *G06F 9/46* (2006.01)
  *G06F 9/455* (2006.01)
  *A63F 13/30* (2014.01)

(52) U.S. Cl.
  CPC ....... *G06F 9/45504* (2013.01); *A63F 2300/209* (2013.01); *A63F 13/12* (2013.01); *A63F 2300/552* (2013.01)
  USPC .............................. 719/327; 713/321; 463/42

(58) Field of Classification Search
  None
  See application file for complete search history.

(56) References Cited

U.S. PATENT DOCUMENTS

| | | | | |
|---|---|---|---|---|
| 6,287,198 | B1 * | 9/2001 | McCauley ....................... | 463/37 |
| 8,502,754 | B2 * | 8/2013 | Lin ................................. | 345/82 |
| 2001/0029205 | A1 | 10/2001 | Taho et al. | |
| 2001/0031665 | A1 | 10/2001 | Taho et al. | |
| 2003/0131136 | A1 * | 7/2003 | Emerson et al. .............. | 709/250 |
| 2004/0005928 | A1 | 1/2004 | Eguchi et al. | |
| 2004/0157664 | A1 | 8/2004 | Link | |
| 2004/0176170 | A1 * | 9/2004 | Eck et al. ........................ | 463/43 |
| 2005/0130744 | A1 * | 6/2005 | Eck et al. ........................ | 463/43 |
| 2005/0272504 | A1 | 12/2005 | Eguchi et al. | |
| 2006/0009290 | A1 * | 1/2006 | Taho et al. ....................... | 463/43 |
| 2006/0046824 | A1 | 3/2006 | Silva et al. | |
| 2006/0069543 | A1 * | 3/2006 | Sajwani et al. ................. | 703/24 |
| 2006/0142991 | A1 * | 6/2006 | Sajwani et al. ................. | 703/25 |
| 2006/0259292 | A1 * | 11/2006 | Solomon et al. ................ | 703/27 |
| 2007/0121534 | A1 | 5/2007 | James et al. | |

FOREIGN PATENT DOCUMENTS

| | | |
|---|---|---|
| JP | 10-069393 | 3/1998 |
| JP | 2001-314644 | 11/2001 |
| JP | 2002-027038 | 1/2002 |
| JP | 2002-132622 | 10/2002 |
| JP | 2001-340641 | 12/2011 |

OTHER PUBLICATIONS

Japanese Office Action (Notice of Reasons for Rejection) issued for corresponding Japanese Patent Application No. 2008-046849, dated Sep. 20, 2012.
Yomogida Hiroki, "Leading Trends: Next-Generation Portable Game Apparatus Appears," Nikkei Electronics, Japan, Nikkei Bp Inc., Jun. 7, 2004, 875-th issue, p. 63 (with partial translation).

* cited by examiner

*Primary Examiner* — H S Sough
*Assistant Examiner* — Umut Onat
(74) *Attorney, Agent, or Firm* — Nixon & Vanderhye, P.C.

(57) ABSTRACT

A first information processing apparatus (superordinate model) comprises an emulation driver program storing unit which stores, in advance, an emulation driver program for: receiving a command issued by a second-device-using application program created for a second information processing apparatus (subordinate model); and controlling a first device mounted on the first information processing apparatus. At an execution of the second-device-using application program, the first information processing apparatus executes the second-device-using application program while controlling the first device by using the emulation driver program stored in the emulation driver program storing unit.

20 Claims, 11 Drawing Sheets

F I G. 1
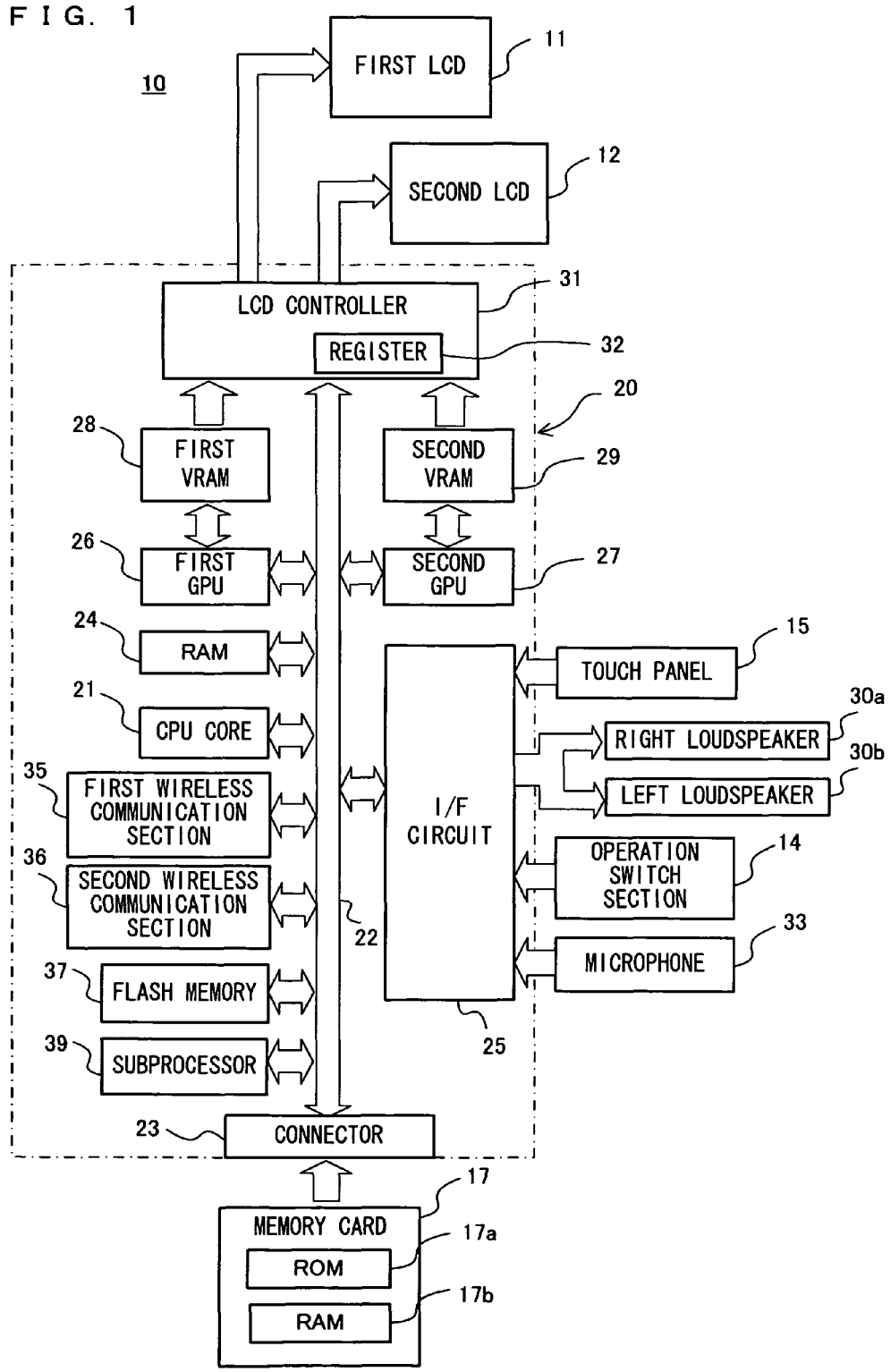

F I G. 3
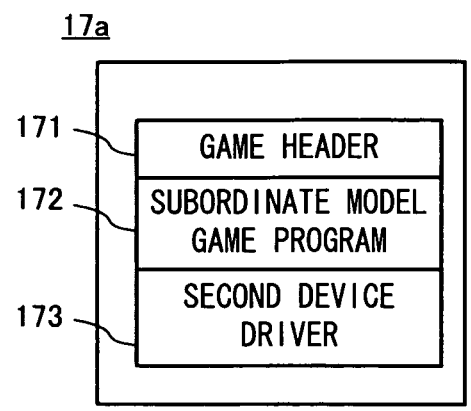
F I G. 4
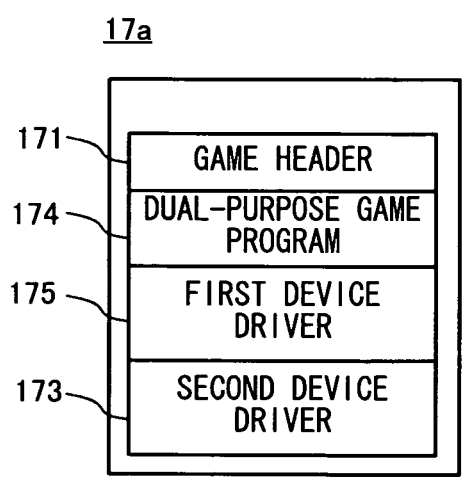

INFORMATION PROCESSING SYSTEM CONFIGURED TO EMULATE SOFTWARE DURING AN EMULATION MODE

CROSS REFERENCE TO RELATED APPLICATION

The disclosure of Japanese Patent Application No. 2008-046849, filed Feb. 27, 2008, is incorporated herein by reference.

BACKGROUND OF THE INVENTION

1. Field of the Invention

The present invention relates to an information processing system comprising a first information processing apparatus and a second information processing apparatus compatible with the first information processing apparatus. The present invention particularly relates to a control of an execution, on the second information processing apparatus, of software created for the first information processing apparatus.

2. Description of the Background Art

There is a known conventional entertainment apparatus having compatibility with an existing entertainment apparatus (e.g., Japanese Laid-Open Patent Publication No. 2001-314644). The conventional entertainment apparatus (hereinafter, referred to as a superordinate model) has two operation modes, i.e., a first mode and a second mode. The first mode is a normal mode to perform a normal operation of the apparatus, and the second mode is a compatibility mode to perform an operation on the assumption of compatibility with another model. The superordinate model usually starts up and operates in the normal mode. However, the superordinate model shifts to the compatibility mode when executing a title (software) dedicated for an existing entertainment apparatus (hereinafter, referred to as a subordinate model).

The superordinate model includes first processor means, which has an MPU (main processing unit) and a GP (graphics processor), and second processor means which has an IOP (input/output subprocessor). In the normal mode, the first processor means acts as a main CPU and a rendering processor, and the second processor means acts as an I/O processor. In the compatibility mode, on the other hand, the second processor means acts as a main CPU, and the first processor means acts as a rendering processor. Here, the second processor means is a same processor core as a CPU of the subordinate model. Therefore, the second processor means is able to execute a program code which is prepared for the CPU of the subordinate model, and perform same operations as those performed by the CPU of the subordinate model.

[Patent Document 1] Japanese Laid-Open Patent Publication No. 2001-314644

However, the above entertainment apparatus disclosed in the Japanese Laid-Open Patent Publication No. 2001-314644 has the following problem. When the superordinate model executes, in the compatibility mode, the title (software) of the subordinate model, the same processor core as that of the subordinate model is used as the main CPU. Accordingly, the superordinate model is able to perform the same operations as those of the subordinate model, and thus compatibility is sufficiently obtained. However, when operating the software of the subordinate model in the compatibility mode, the superordinate model is unable to use functions newly added to the superordinate model.

SUMMARY OF THE INVENTION

Therefore, an object of the present invention is to provide an information processing system which allows, when a superordinate model compatible with a subordinate model operates software of the subordinate model, a device mounted on the superordinate model to be usable.

The present invention has the following features to achieve the object mentioned above. Note that, reference numerals, supplementary descriptions and the like indicated between parentheses are merely provided to facilitate the understanding of the present invention in relation to the later-described embodiment, rather than limiting the present invention in any way.

A first aspect of the present invention is an information processing system comprising: a first information processing apparatus (10) having a first device (35); a second information processing apparatus (50) having a second device (36) different from the first device; first-device-using software including a first device driver program (175) for controlling the first device and including a first-device-using application program (176) which is created so as to issue a command receivable by the first device driver program and thereby control the first device; and second-device-using software including a second device driver program (173) for controlling the second device and including a second-device-using application program (172) which is created so as to issue a command receivable by the second device driver program and thereby control the second device. The first information processing apparatus further has emulation driver program storing means (37) and first application execution means (21). The emulation driver program storing means stores, in advance, an emulation driver program (372) which receives the command for controlling the second device and controls the first device, which command is issued based on the second-device-using application program. At an execution of the first-device-using application program included in the first-device-using software, the first application execution means receives, by using the first device driver program included in the first-device-using software, the command for controlling the first device, which command is issued based on the first-device-using application program, and executes the first-device-using application program while controlling the first device by using the first device driver program. At an execution of the second-device-using application program included in the second-device-using software, the first application execution means receives, by using the emulation driver program stored in the emulation driver program storing means, the command for controlling the second device, which command is issued based on the second-device-using application program, and executes the second-device-using application program while controlling the first device by using the emulation driver program. The second information processing apparatus further has second application execution means (51) for, at an execution of the second-device-using application program included in the second-device-using software, receiving, by using the second device driver program included in the second-device-using software, the command for controlling the second device, which command is issued based on the second-device-using application program, and executing the second-device-using application program while controlling the second device by using the second device driver program.

Here, the second device is different from the first device. Here, being "different" means either of the following: (a) the devices are different in function; or (b) although the devices have a same function, the function is different in performance between the devices. An example of this difference is given below.

Example of (a)
(1) One device is a wired communication device, and the other device is a wireless communication device.
(2) One device is an acceleration sensor, and the other device is a microphone (in this case, for example, an instruction to obtain a magnitude of an acceleration of the acceleration sensor is associated with an instruction to obtain a volume of the microphone device).
(3) One device is a mouse, and the other device is a touch panel.
(4) One device is a camera, and the other device is a scanner.
(5) One device is a camera, and the other device is a microphone (in this case, for example, an instruction to obtain a brightness of the camera device is associated with an instruction to obtain a volume of the microphone device).
Example of (b)
(1) The devices are both wireless communication devices which are different in performance in terms of communication speed and power consumption.
(2) The devices are both touch panels which are different in performance in terms of resolution and noise.
(3) The devices are both display devices which are different in performance in terms of the number of colors.

The above specific examples merely show that the present invention is not limited to the later-described embodiment. The present invention is not limited to these examples.

The first information processing apparatus has processing means (first application execution means) operable to execute the first-device-using application program and the second-device-using application program. The second information processing apparatus has processing means (second application execution means) operable to execute the second-device-using application program. In other words, the processing means of the first information processing apparatus is the same as or compatible with the processing means of the second information processing apparatus. In the case where the processing means of the first information processing apparatus is the same as the processing means of the second information processing apparatus, the first-device-using application program and the second-device-using application program are created so as to be operable on each processing means. In the case where the processing means of the first information processing apparatus is compatible with the processing means of the second information processing apparatus, the first-device-using application program is created so as to be operable on the processing means of the first information processing apparatus, and the second-device-using application program is created so as to be operable on the processing means of the second information processing apparatus.

Further, the first information processing apparatus may be an apparatus which is designed and released after the release of the second information processing apparatus. The reason for this is that since the first information processing apparatus has the emulation driver program storing means, the emulation driver program allows the second-device-using software to be, even if the second-device-using software is created on the premise of being executed using the second device of the second information processing apparatus, executed by the first information processing apparatus using the first device. In particular, the present invention is applicable when the first device, which is a result of enhancing the performance of the second device of the second information processing apparatus, is mounted on the first information processing apparatus, and the first information processing apparatus is released as a high-performance model after the release of the second information processing apparatus. This makes it possible to execute, on the first information processing apparatus, software dedicated for the second information processing apparatus by using the first device, which software is created on the premise of being executed using the second device. Note that, it is understood that the present invention is also applicable when the first device, which is a result of degrading the performance of the second device of the second information processing apparatus for the purpose of cost cutting or the like, is mounted on the first information processing apparatus, and the first information processing apparatus is released as a lower-priced model after the release of the second information processing apparatus.

According to the first aspect, in the case where the second-device-using application program, which is created on the premise of being executed using the second device, is executed by the first information processing apparatus having compatibility with the second information processing apparatus, the second-device-using application program can be executed using the first device of the first information processing apparatus.

In a second aspect of the present invention based on the first aspect, the information processing system further comprises selective software which includes a selective application program, the first device driver program and the second device driver program, which selective application program is created so as to allow a first process and a second process to be executed in a selective manner, which first process is for issuing the command, receivable by the first device driver program, for controlling the first device, and which second process is for issuing the command, receivable by the second device driver program, for controlling the second device. At an execution of the selective application program included in the selective software, the first application execution means: uses the first device driver program included in the selective software such that the first process is selected from among the first and second processes; receives, by using the first device driver program, the command for controlling the first device which is issued by the first process; and executes the selective application program while controlling the first device by using the first device driver program. At an execution of the selective application program included in the selective software, the second application execution means: uses the second device driver program included in the selective software such that the second process is selected from among the first and second processes; receives, by using the second device driver program, the command for controlling the second device which is issued by the second process; and executes the selective application program while controlling the second device by using the second device driver program.

According to the second aspect, the driver programs included in the selective software are used to control the first device and the second device, respectively. This enables, for example, a use of a driver program whose version is newer and which is more optimized than the driver stored in the emulation driver program storing means.

A third aspect of the present invention is an information processing system comprising: a first information processing apparatus (10) having a first device (35); a second information processing apparatus having a second device (36) different from the first device; second-device-using software; and selective software. The second-device-using software includes a second device driver program (173) for controlling the second device and includes a second-device-using application program (172) which is created so as to issue a command receivable by the second device driver program and thereby control the second device. The selective software includes a selective application program (174), a first device driver program and the second device driver program, which selective application program is created so as to allow a first process and a second process to be executed in a selective manner, which first process is for issuing a command, receivable by the first device driver program, for controlling the first device, and which second process is for issuing the command, receivable by the second device driver program, for controlling the second device. The first information processing apparatus further has: emulation driver program storing means (37) and first application execution means (21). The emulation driver program storing means stores, in advance, an emulation driver program which receives the command for controlling the second device and controls the first device, which command is issued based on the second-device-using application program. At an execution of the second-device-using application program included in the second-device-using software, the first application execution means executes the second-device-using application program while controlling the first device by using the emulation driver program stored in the emulation driver program storing means. At an execution of the selective application program included in the selective software, the first application execution means: uses the first device driver program included in the selective software such that the first process is selected from among the first and second processes; receives, by using the first device driver program, the command for controlling the first device which is issued by the first process; and executes the selective application program while controlling the first device by using the first device driver program. The second information processing apparatus further has second application execution means for, at an execution of the second-device-using application program included in the second-device-using software, executing the second-device-using application program while controlling the second device by using the second device driver program included in the second-device-using software, and at an execution of the selective application program included in the selective software, using the second device driver program included in the selective software such that the second process is selected from among the first and second processes, receiving, by using the second device driver program, the command for controlling the second device which is issued by the second process, and executing the selective application program while controlling the second device by using the second device driver program.

According to the third aspect, at the execution of the second-device-using application program, the first information processing apparatus can execute the second-device-using application program by using the first device of the first information processing apparatus. Further, at the execution of the selective application program, the driver programs included in the selective software are used to control the first device and the second device, respectively. For this reason, the first information processing apparatus can use a more optimized driver program.

In a fourth aspect of the present invention based on the first aspect, the second device has a function in common with the first device, and the function of the first device and the function of the second device differ in performance.

According to the fourth aspect, the first device, which differs in performance, can be used by the second-device-using application program.

In a fifth aspect of the present invention based on the first aspect, the first information processing apparatus further has: download means (36) for obtaining an emulation driver upgrade program from a predetermined server via the first device; and upgrade means (21) for upgrading the emulation driver program in the emulation driver upgrade program storing means by using the emulation driver program obtained by the download means.

The fifth aspect allows the emulation driver program storing means to always store an optimized driver.

In a sixth aspect of the present invention based on the first or the third aspect, the emulation driver program converts the received command for controlling the second device to an instruction to control the first device, and controls the first device in accordance with the instruction resulting from the conversion.

According to the sixth aspect, the second-device-using application program can be executed by using the function of the first device which is originally unusable by the second-device-using application program.

In a seventh aspect of the present invention based on the first aspect, the first and second information processing apparatuses are game apparatuses. The first and second devices are wireless communication devices for performing wireless communication. The second-device-using application program is a game program for performing a game process using wireless communication by the second device.

According to the seventh aspect, a game, which is created for the first information processing apparatus, can be executed on the second information processing apparatus by using the second wireless communication device.

In an eighth aspect of the present invention based on the fifth aspect, the first device consumes less power for wireless communication than the second device.

According to the eighth aspect, when a game, created for the second information processing apparatus, is executed by the first information processing apparatus, the execution of the game can be performed with lower power consumption.

In a ninth aspect of the present invention based on the first or the third aspect, the first and second devices are communication devices for performing communication. At least one of communication functions of the second device is unable to communicate with a communication function of the first device. The first information processing apparatus further has the second device. At an execution of the second-device-using application program included in the second-device-using software, the first application execution means executes the second-device-using application program while controlling the second device by using the second device driver program included in the second-device-using software.

In a tenth aspect of the present invention based on the seventh aspect, the first and second devices are wireless communication devices for performing wireless communication. The second device has a first communication mode which allows direct communication between first information processing apparatuses or between second information processing apparatuses, and has a second communication mode for performing communication with a predetermined server. The first application execution means uses the second device when using the first communication mode, and uses the first device when using the second communication mode.

According to the ninth and tenth aspects, when an application program for the first information processing apparatus is executed by the second information processing apparatus, compatibility therebetween can be further improved.

In an eleventh aspect of the present invention based on the third aspect, the second device has a function in common with the first device, and the function of the first device and the function of the second device differ in performance.

In a twelfth aspect of the present invention based on the third aspect, the first information processing apparatus further has: download means (36) for obtaining an emulation driver upgrade program from a predetermined server via the first device; and upgrade means (21) for upgrading the emulation driver upgrade program in the emulation driver program storing means by using the emulation driver upgrade program obtained by the download means.

In a thirteenth aspect of the present invention based on the third aspect, the emulation driver program converts the received command for controlling the second device to an instruction to control the first device, and controls the first device in accordance with the instruction resulting from the conversion.

In a fourteenth aspect of the present invention based on the third aspect, the first and second information processing apparatuses are game apparatuses. The first and second devices are wireless communication devices for performing wireless communication. The second-device-using application program is a game program for performing a game process using wireless communication by the second device.

In a fifteenth aspect of the present invention based on the fourteenth aspect, the first device consumes less power for wireless communication than the second device.

In a sixteenth aspect of the present invention based on the third aspect, the first and second devices are communication devices for performing communication. At least one of communication functions of the second device is unable to communicate with a communication function of the first device. The first information processing apparatus further has the second device. At an execution of the second-device-using application program included in the second-device-using software, the first application execution means executes the second-device-using application program while controlling the second device by using the second device driver program included in the second-device-using software.

In a seventeenth aspect of the present invention based on the sixteenth aspect, the first and second devices are wireless communication devices for performing wireless communication. The second device has a first communication mode which allows direct communication between first information processing apparatuses or between second information processing apparatuses, and has a second communication mode for performing communication with a predetermined server. The first application execution means uses the second device when using the first communication mode, and uses the first device when using the second communication mode.

According to the eleventh to seventeenth aspects, the same effects as those of the fourth to tenth aspects can be obtained.

An eighteenth aspect of the present invention is a first information processing apparatus in an information processing system, the system comprising: the first information processing apparatus having a first device; a second information processing apparatus having a second device different from the first device; and predetermined software including a driver program for controlling the second device and including an application program which is created so as to issue a command receivable by the driver program and thereby control the second device. The first information processing apparatus further has emulation driver program storing means and application execution means. The emulation driver program storing means stores, in advance, an emulation driver program for receiving an instruction to use the second device, which instruction is issued based on the application program, and controlling the first device. At an execution of the application program included in the predetermined software, the application execution means receives, by using the emulation driver program stored in the emulation driver program storing means, the command for controlling the second device, which command is issued based on the application program, and executes the application program while controlling the first device by using the emulation driver program.

According to the eighteenth aspect, when an application created for the second information processing apparatus is executed by the first information processing apparatus, the application can be executed using the first device.

A nineteenth aspect of the present invention is an emulation program for receiving a command from an application program which is created so as to issue the command receivable by a driver program for controlling a predetermined device and thereby control the predetermined device, and for converting the command to a command for a driver program for controlling a different device from the predetermined device.

The nineteenth aspect allows an application program, which is created in consideration of a particular device, to be executed by using a different device from the particular device, and allows same operations as those of the particular device to be performed.

A twentieth aspect of the present invention is a computer-readable storage medium storing an emulation driver program to be executed by an information processing apparatus comprising a first device having at least a first function and a second device having the first function and a second function different from the first function, which first function of the first device has greater performance than the first function of the second device. The emulation driver program causes processing means of the information processing apparatus to perform: a first device controlling step and a second device controlling step. The first device controlling step is a step of: issuing a command receivable by a driver program for controlling the second device; receiving a command from an application program which is created so as to control the second device; when the received command is a first function control instruction to control the first function of the second device, converting the received first function control instruction to an instruction to control the first function of the first device; and controlling the first device in accordance with the converted instruction. The second device controlling step is a step of, when the received command is a second function control instruction to use the second function of the second device, controlling the second device in accordance with the second function control instruction.

According to the twentieth aspect, an application program, which is created on the assumption of being executed using the second device, can be executed using the first device which has greater performance than the second device.

According to the present invention, when a superordinate model, which is developed after a conventional model, executes software of the conventional model, the superordinate model is able to use a newly mounted device therein, while maintaining compatibility with the conventional model.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram of a superordinate model 10 according to an embodiment of the present invention;

FIG. 3 is a memory map illustrating a memory space of a ROM 17a of a memory card 17 in the case where the memory card 17 is used as a subordinate model card;

FIG. 4 is a memory map illustrating the memory space of the ROM 17a of the memory card 17 in the case where the memory card 17 is used as a dual-purpose card;

DESCRIPTION OF THE PREFERRED EMBODIMENTS

Figure 2:
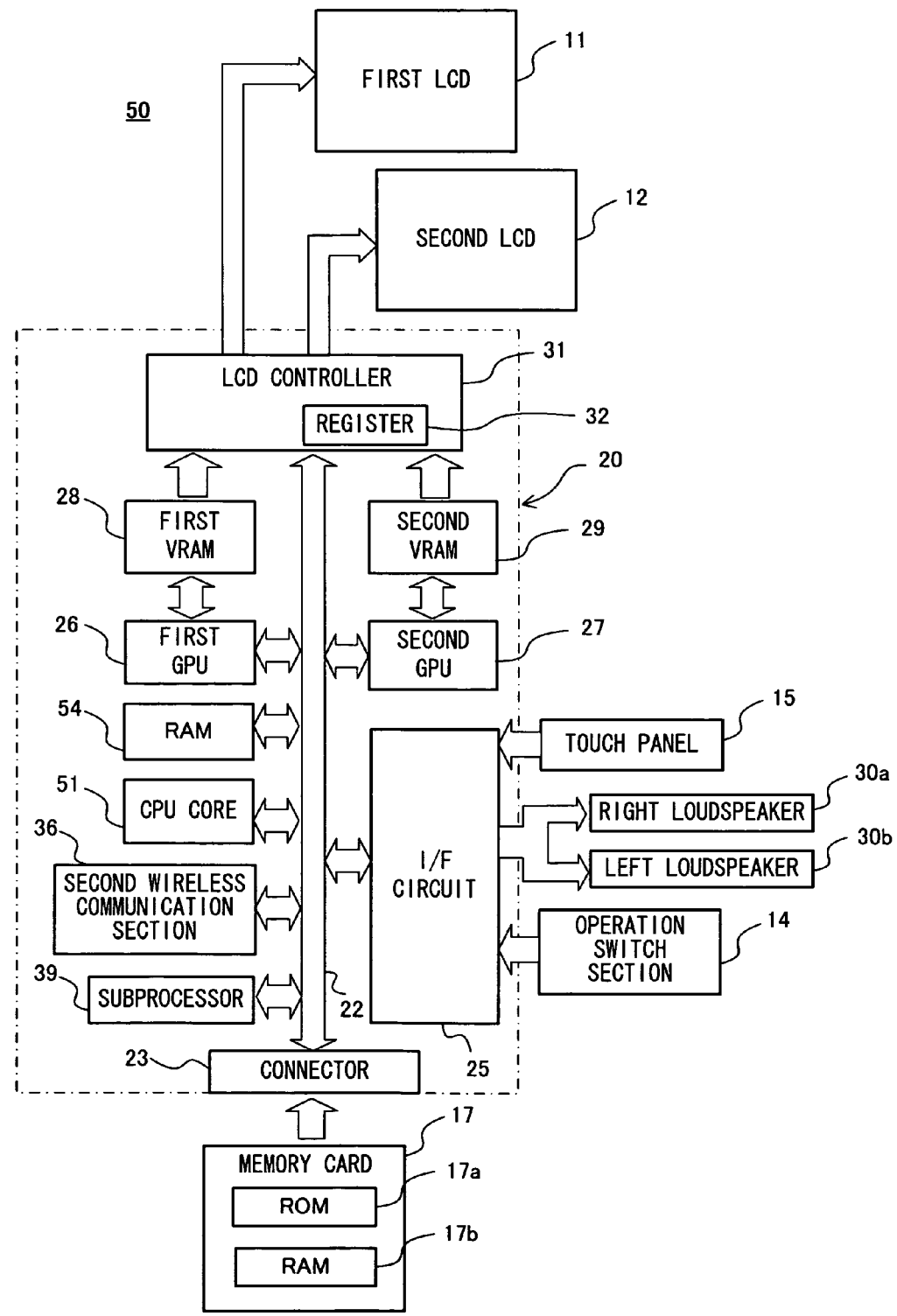
FIG. 2 is a block diagram of a subordinate model 50 according to the embodiment of the present invention.

Next, a configuration of a first handheld game apparatus 10 according to an embodiment of the present invention (i.e., "first information processing apparatus" in the present invention) will be described with reference to FIG. 1. Here, the first handheld game apparatus 10 has compatibility with and better performance than a later-described second handheld game apparatus 50 (i.e., "second information processing apparatus" in the present invention). For this reason, in the description below, the first handheld game apparatus 10 is referred to as a superordinate model 10, and the second handheld game apparatus 50 is referred to as a subordinate model 50.

FIG. 1 is a block diagram showing a configuration of the superordinate model 10. As shown in FIG. 1, the superordinate model 10 comprises an electronic circuit card 20. The electronic circuit card 20 has a CPU core 21 mounted thereon. The CPU core 21 has compatibility with a CPU core 51 of the subordinate model 50 which will be described later. The CPU core 21 has higher processing capabilities than the CPU core 51. In other words, the CPU core 21 of the superordinate model 10 ranks as a superordinate CPU having compatibility with the CPU core 51 of the subordinate model 50. To be more specific, the CPU core 21 of the superordinate model 10 can selectively execute either one of a compatibility mode, which is for performing same operations as those of the CPU core 51 of the subordinate model 50, and a dedicated mode which is greater in processing capabilities than the compatibility mode (e.g., being able to provide an operation clock and a dedicated instruction).

Via a bus 22, the CPU core 21 is connected to a connector 23, an input/output interface circuit (shown as I/F circuit in the diagram) 25, a first GPU (Graphics Processing Unit) 26, a second GPU 27, a RAM 24, an LCD controller 31, a first wireless communication section 35 and a second wireless communication section 36. A later-described memory card 17 is connected to the connector 23 in a removable manner. The RAM 24 stores, e.g., a game program loaded from the memory card 17, temporary data which is obtained when the CPU core 21 executes the game program, and data for generating game images. Note that, since the game program or the like loaded into the RAM 24 is one of the features of the present invention, a description thereof will be given later.

Connected to the I/F circuit 25 are a touch panel 15, a right loudspeaker 30a, a left loudspeaker 30b, an operation switch section 14 of FIG. 1 comprising having, for example, a cross switch 14a, and an action button, and a microphone 33.

A first VRAM (Video RAM) 28 is connected to the first GPU 26, and a second VRAM 29 is connected to the second GPU 27. In accordance with an instruction from the CPU core 21, the first GPU 26 generates a first game image based on data used for game image generation, which data is stored in the RAM 24, and writes the first game image into the first VRAM 28. The second GPU 27 also follows an instruction from the CPU core 21 to generate a second game image, and writes the second game image into the second VRAM 29. The first VRAM 28 and the second VRAM 29 are connected to the LCD controller 31.

The LCD controller 31 includes a register 32. The register 32 stores a value of either 0 or 1 in accordance with an instruction from the CPU core 21. When the value of the register 32 is 0, the LCD controller 31 outputs to the first LCD 11 the first game image which has been written into the first VRAM 28, and outputs to the second LCD 12 the second game image which has been written into the second VRAM 29. When the value of the register 32 is 1, the first game image which has been written into the first VRAM 28 is outputted to the second LCD 12, and the second game image which has been written into the second VRAM 29 is outputted to the first LCD 11.

The first wireless communication section 35 and the second wireless communication section 36 each have a function to perform wireless communication, e.g., with another game apparatus or with a server via a predetermined access point. In the wireless communication, data used for a game process or other data are exchanged, for example. Specifically, the superordinate model 10 is able to perform the following type of communication:

(1) Direct communication with another superordinate model 10 (later-described local communication);

(2) Direct communication with the subordinate model 50 (later-described local communication); and (3) Communication with a server or the like via an access point. Note that, the above communications (1) and (2) are performed using the second wireless communication section 36, and the above communication (3) is performed using the first wireless communication section 35. The reason for performing the communication (1) by using the second wireless communication section 36 is that, as described below, the first wireless communication section 35 does not support the later-described local communication. Also, the reason for performing the communication (2) by using the second wireless communication section 36 is that, as described below, the subordinate model 50 does not have the first wireless communication section 35, and the first wireless communication section 35 and the second wireless communication section 36 are unable to directly communicate with each other. Note that, if the first wireless communication section 35 is configured so as to support the local communication, the above communication (1) can be performed using the first wireless communication section 35.

The first wireless communication section 35 and the second wireless communication section 36 are different in function, particularly in the following points:

(1) Communication speed—the first wireless communication section 35 is capable of performing faster wireless communication than the second wireless communication section 36.
(2) Security technology mounted thereon—the first wireless communication section 35 employs, as a wireless LAN encryption technology, a more secure technology than that of the second wireless communication section 36. More specifically, the second wireless communication section 36 employs so-called WEP (Wired Equivalent Privacy), whereas the first wireless communication section 35 employs WPA (Wi-Fi ProtectedAccess) having an improved security level as well as WEP, either of which can be selected.
(3) Presence or absence of a power saving function—the second wireless communication section 36 does not have a power saving function mounted thereon, and therefore, when the second wireless communication section 36 is active (i.e., connected to a wireless LAN or the like), the second wireless communication section 36 consumes, even if game data transmission/reception is not performed (i.e., idle state), a same amount of power as that used when game data transmission/reception is performed. That is, when the second wireless communication section 36 is active, a constant amount of power is always consumed. On the other hand, the first wireless communication section 35 has a power saving function mounted thereon. Therefore, when the first wireless communication section 35 is in the idle state in which data transmission/reception is not performed, the amount of power to be consumed can be reduced as compared to when the data transmission/reception is performed.
(4) Presence or absence of a local communication function— the second wireless communication section 36 supports the local communication, whereas the first wireless communication section 35 does not support the local communication. For this reason, the first wireless communication section 35 and the second wireless communication section 36 cannot directly communication with each other.

Here, the second wireless communication section 36 is the same as a wireless communication section 36 mounted on the later-described subordinate model 50. To be specific, a main reason for mounting the second wireless communication section 36 on the first game apparatus is to obtain compatibility with the subordinate model 50. Note that, "to obtain compatibility" means to enable direct communication between the superordinate model 10 and the subordinate model 50. Further, as described above, the first wireless communication section 35 has better performance than the second wireless communication section 36 in terms of communication speed, security and power saving.

A flash memory 37 is a NAND flash memory. In the present embodiment, the flash memory stores an emulation driver program or the like. However, storage means herein may be any type of memory as long as the memory is a non-volatile memory, regardless of rewritable or non-rewritable.

A subprocessor 39 is a processor for executing a later-described driver program. Note that, the subprocessor 39 is the same as a subprocessor mounted on the later-described subordinate model 50.

Next, a configuration of the subordinate model 50 which is an existing handheld game apparatus will be described. The subordinate model 50 is an apparatus with which the above-described superordinate model 10 attempts to have compatibility.

FIG. 2 is a block diagram showing the configuration of the subordinate model 50. As shown in this diagram, a fundamental configuration of the subordinate model 50 is a result of removing the first wireless communication section 35, the flash memory 37 and the microphone 33 from the functional configuration of the superordinate model 10 described with reference to FIG. 1. Further, the subordinate model 50 has the CPU core 51 mounted thereon, the CPU core 51 having compatibility with the CPU core 21 of the above-described superordinate model 10. However, as described above, the CPU core 51 is lower in processing capability than the CPU core 21 mounted on the superordinate model 10. Note that, the CPU core 21 has the compatibility mode, which is for performing same processing as that of the CPU core 51, as well as the dedicated mode which is greater in performance than the compatibility mode. The CPU core 21 operates in the compatibility mode when executing an application dedicated for the subordinate model 50, and operates in the dedicated mode when executing an application dedicated for the superordinate model 10. A RAM 54 of the second game apparatus has a smaller capacity than the RAM 24 of the first game apparatus. Thus, these RAMs are different in capacity. Therefore, the CPU cores and the RAMs are each assigned with a different reference numeral, whereby each of the CPU cores and the RAMs are distinguished. Since the other components of the subordinate model 50 are the same as those of the superordinate model 10, the said other components are denoted by the same reference numerals as those used for the superordinate model 10, and detailed descriptions thereof will be omitted. Here, the RAM 24 and the RAM 54 may have a same capacity.

Note that, the subordinate model does not have a microphone. A microphone is a device which is newly added to the superordinate model.

The subordinate model 50 is capable of performing the following communications:
(1) Direct communication with another subordinate model 50;
(2) Direct communication with the superordinate model 10; and
(3) Communication with a server or the like via an access point.

As described above, the communication (2) is performed with the superordinate model 10 which performs communication using the second wireless communication section 36.

Next, the memory card 17 to be used in the above two handheld game apparatuses will be described. The memory card 17 can be detachably mounted either on the superordinate model 10 or on the subordinate model 50. Then, the memory card 17 has mounted thereon a ROM 17a for storing an application program (game program or the like) and a driver program and a RAM 17b for rewritably storing backup data.

In the present embodiment, there are two types of driver programs as follows:
(1) Driver Program 1—a driver program for the first wireless communication section 35 (for receiving, from an application, a command to control the first wireless communication section 35, and issuing a control instruction to the second wireless communication section 36). Note that, this driver supports not the local communication (described later) but Wifi communication (described later). In the description below, this driver is referred to as a "first device driver".
(2) Driver Program 2—a driver program for the second wireless communication section 36 (for receiving, from an application, a command to control the second wireless communication section 36, and issuing a control instruction to the second wireless communication section 36).

Note that, this driver supports both the local communication (described later) and the Wifi communication (described later). In the description below, this driver is referred to as a "second device driver".

In the present embodiment, there are three types of application programs as follows:

(1) Application Program 1—an application program, created for the subordinate model 50, for issuing a command which the second device driver can receive and using the second wireless communication section 36. This application program can be executed in the compatibility mode of the CPU core 21 of the superordinate model 10. In the description below, this application program is referred to as a "subordinate model application program" or as a "subordinate model game program".

(2) Application Program 2—an application program, created for the superordinate model 10, for using functions dedicated for the superordinate model 10 (in the present embodiment, a microphone, a command executable only in the dedicated mode of the CPU core 21, and a process using the first wireless communication section 35). This program is created such that, in the local communication (described later), the program issues a command which the second device driver can receive, and uses the second wireless communication section 36, and in the Wifi communication (described later), the program issues a command which the first device driver can receive, and uses the first wireless communication section 35. Note that, this application program is executable in the dedicated mode of the CPU core 21 of the superordinate model 10. In the description below, this application program is referred to as a "superordinate model application program" or as a "superordinate model game program".

(3) Application Program 3—an application program, created to be operated either on the superordinate model 10 or on the subordinate model 50, which changes a process to be performed, by providing a conditional branch in accordance with whether being executed by the superordinate model 10 or by the subordinate model 50. In the case of being executed by the superordinate model 10, a process for using a dedicated function is performed, and in the case of being executed by the subordinate model 50, a process for using a dedicated function is not performed. To be more specific, at initial booting, the superordinate model 10 writes identification data, which indicates an identification thereof, into a predetermined region in the RAM 24, which predetermined region has not been used yet by the superordinate model 10. Then, the application program refers to the data in the predetermined region to determine whether the application program is currently executed by the superordinate model 10 or by the subordinate model, thereby branching the processing. Further, the application program is created such that: when executed by the superordinate model 10 for the local communication, the application program issues a command which the second device driver can receive, and uses the second wireless communication section 36; and when executed by the superordinate model 10 for the Wifi communication, the application program issues a command which the first device driver can receive, and uses the first wireless communication section 35. Further, the application program is created such that when executed by the subordinate model 50 for the local communication, the application program issues a command which the second device driver can receive, and uses the second wireless communication section 36. Note that, when the application program is executed by the superordinate model 10, the CPU core 21 operates in the dedicated mode. In the description below, this application program is referred to as a "dual-purpose application program" or as a "dual-purpose game program".

Note that, these application programs are executed by the CPU core 21 or by the CPU core 51, whereas the driver programs are executed by the subprocessor 39. Specifically, the subprocessor executing a driver receives a command issued by the CPU core 21 or 51 executing an application program, and controls a device accordingly.

In the present embodiment, there are three types of the memory card 17 as follows:

(1) A type which stores the subordinate model application program and the second device driver (hereinafter, referred to as a subordinate model card).

(2) A type which stores the dual-purpose application program, the first device driver and the second device driver (since this type of memory card 17 can be executed either by the superordinate model or by the subordinate model, this type of memory card 17 will hereinafter be referred to as a dual-purpose card).

(3) A type which stores the superordinate model application program, the first device driver and the second device driver (hereinafter, referred to as a superordinate model card).

Note that, each type of the memory card 17 has a common housing shape and connector specifications. Each type of the memory card 17 can be inserted into the superordinate model 10 and the subordinate model 50, can be connected to the connector 23, and can be read by the CPUs.

Note that, in the present embodiment, the superordinate model application program is created so as to use the second wireless communication section 36 for the location communication and to use the first wireless communication section 35 in the Wifi communication. However, as an exemplary modification, the first wireless communication section 35 may be assigned with a local communication function, and the first device driver may be configured to support the local communication, and the superordinate model application program may be created so as to use the first wireless communication section 35 for both the local communication and the Wifi communication. In this modification example, the superordinate model card may store the superordinate model application program and the first device driver (i.e., storing the second device driver is unnecessary).

Figure 5:
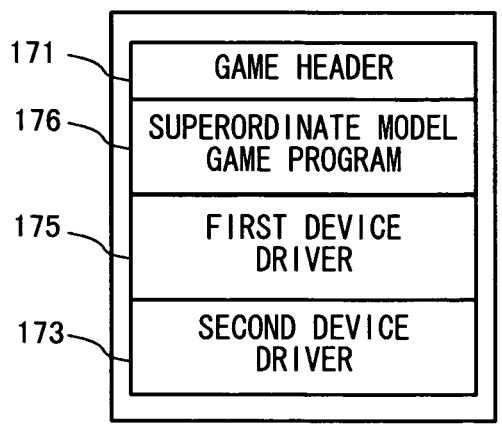
FIG. 5 is a memory map illustrating the memory space of the ROM 17a of the memory card 17 in the case where the memory card 17 is used as a superordinate model card.

FIGS. 3 to 5 show memory maps of the ROM 17a of the memory card 17. FIG. 3 shows a memory map of the subordinate model card; FIG. 4 shows a memory map of the dual-purpose card; and FIG. 5 shows a memory map of the superordinate model card.

As shown in FIG. 3, in the case where the memory card 17 is used as the subordinate model card, the ROM 17a stores a game header 171, a subordinate model game program 172 and a second device driver 173.

The game header 171 is 4-byte data for identifying a game stored in the memory card 17. The subordinate model game program 172 is a game processing program which is created on the premise that the program is executed by the subordinate model 50. To be specific, this program is created to issue a command to the second device driver in order to use a driver program dedicated for the second wireless communication section 36. Further, this program does not contain a process for using dedicated functions of the superordinate model 10.

The second device driver 173 is for controlling the second wireless communication section 36. The second device driver 173 has a function to receive the command issued from the subordinate model game program 172, which command is for the second wireless communication section 36, and to control the second wireless communication section 36 in accordance with the command. Note that, a command which the first device driver can receive is different from the command which the second device driver can receive. Therefore, even if a command for using the first wireless communication section 35, which command is for the first wireless communication section 35, is issued to the second device driver 173, a process corresponding to the command is not performed. In the present embodiment, the first wireless communication section 35 is a high-performance device developed after the second wireless communication section 36. Thus, the second device driver 173 is not created on the premise of the existence of the first wireless communication section 35.

Next, in FIG. 4, when the memory card 17 is used as the dual-purpose card, the ROM 17a stores the game header 171, a dual-purpose game program 174, a first device driver 175 and the second device driver 173. Since the game header 171 is the same as described above, a description thereof will be omitted.

The dual-purpose game program 174 is a game processing program which can be executed regardless of whether the ROM 17a is inserted into the subordinate model 50 or into the superordinate model 10. This game program changes a process to be performed, based on whether the game program is executed by the superordinate model 10 or by the subordinate model 50. The game program is created such that when executed by the superordinate model 10, a game process using dedicated functions of the superordinate model 10 can be performed. To be more specific, for example, when executed by the superordinate model 10, the game program issues to the first device driver a command to control the first wireless communication section 35, whereas when executed by the subordinate model 50, the game program issues to the second device driver a command to control the second wireless communication section 36. Further, the game program is programmed such that when a wireless setting menu is opened in the game in the case where the game program is executed by the subordinate model 50, the setting menu is opened only for WEP, whereas in the case where the game program is executed by the superordinate model 10, the setting menu is opened so as to also enable setting for WPA. Further, for example, when the game program is executed by the superordinate model 10, processing proceeds such that a process to use a microphone is performed, whereas when the game program is executed by the superordinate model 10, processing proceeds such that a process to use a microphone is not performed. In other words, the program is created such that the processing branches in accordance with whether the program is executed by the superordinate model 10 or by the subordinate model 50. Thus, the dual-purpose game program 174 has portions which respectively perform, as a part of game processing, different processes in the case where the game program is executed by the superordinate model 10 and in the case where the game program is executed by the subordinate model 50, based on differences between devices respectively included in the superordinate model 10 and the subordinate model 50.

The first device driver 175 is for controlling the first wireless communication section 35. To be specific, upon receiving, from the dual-purpose game program, such a command as described later for the first wireless communication section, the first device driver 175 controls the first wireless communication section.

The second device driver 173 is the same as that in the case of the subordinate model card. Upon receiving a command for the second wireless communication section, which command is issued by the dual-purpose game program 174, the second driver 173 controls the second wireless communication section 36.

As will hereinafter be described in detail, when the dual-purpose card is inserted into the superordinate model 10, the first device driver 175 and the second device driver 173 are both loaded into the RAM 24, and then used. Further, when the dual-purpose card is inserted into the subordinate model 50, the second device driver 173 is loaded into the RAM 54, and then used.

Next, as shown in FIG. 5, when the memory card 17 is used as the superordinate model card, the ROM 17a stores the game header 171, a superordinate model game program 176, the first device driver 175 and the second device driver 173. Since the game header 171 and the drivers are the same as described above, descriptions thereof will be omitted.

The superordinate model game program 176 is a game processing program which is created on the premise that the game program is executed by the CPU core 21 of the superordinate model 10. Note that, when the game program is executed, the CPU core 21 operates in the dedicated mode. The superordinate model game program 176 allows functions of the superordinate model 10 (e.g., a function to receive an instruction specifically directed to the CPU core 21, which instruction is not directed to the CPU core 51 of the subordinate model 50) to be made best use of. Accordingly, even though the superordinate model card can be inserted into the subordinate model 50, the subordinate model is unable to perform a game process with the superordinate model card.

Figure 6:
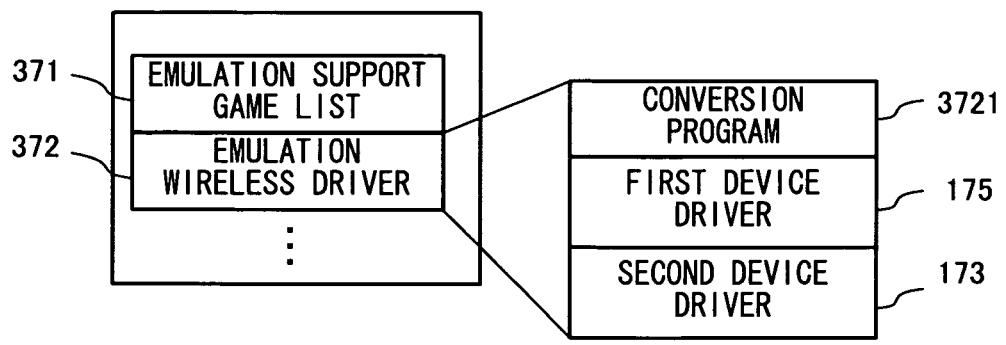
FIG. 6 is a memory map illustrating a memory space of a flash memory 37 of FIG. 1.

Next, data to be stored in the flash memory 37 of the superordinate model 10 will be described. FIG. 6 shows a memory map of the flash memory 37. The flash memory 37 stores an emulation-support game list 371, an emulation wireless driver 372 and the like.

The emulation-support game list 371 is a list of game programs, which are among subordinate model game programs having already been released in the form of the above-described subordinate model card and which can be operated on the superordinate model 10 in an operation mode called "emulator mode" which will be later described. From among a number of conventional games available in the market, a game which can be operated in the "emulator mode" is selected in advance, and a value of the game header 171 of the game is recorded in the emulation-support game list 371.

The emulation wireless driver 372 comprises a conversion program 3721, the first device driver 175 and the second device driver 173. Since the first device driver 175 and the second device driver 173 are the same as described above, descriptions thereof will be omitted. The conversion program 3721 realizes a function to convert a command A, which a game program has issued to the second device driver 173 in order to control the second wireless communication section 36, to a command which the first device driver 175 can receive and which performs control corresponding to the command A. To be more specific, for example, the conversion program 3721 converts a communication start command, which the game program has issued to the second device driver 173 in order to cause the second wireless communication section 36 to start communication, to a command which the first device driver 175 can receive and which causes the first wireless communication section 35 to start communication. Therefore, a conversion table for such command conversion as above is defined in the conversion program 3721. In other words, the conversion program 3721 receives a command for the second wireless communication section 36, which is issued by the game program, and performs a process to convert, based on the conversion table, the command to a command for the first wireless communication section 35. Then, a process is performed for outputting, to the first device driver 175, the converted command for the first wireless communication section 35. Note that, the conversion program 3721 outputs a command, without converting the command, to the first device driver 175, which command has been issued to the first device driver 175 by the game program for the purpose of controlling the first wireless communication section 35.

In the present embodiment, the emulation wireless driver 372 comprises the conversion program 3721, the first device driver 175 and the second device driver 173. However, it is not essential to include the first device driver 175 and the second device driver 173 as long as the emulation wireless driver 372 is designed so as to control the first wireless communication section 35 in accordance with a command which the game program issues to the first device driver 175 for the purpose of controlling the first wireless communication section 35, and so as to control the second wireless communication section 36 in accordance with a command which the game program issues to the second device driver 173 for the purpose of controlling the second wireless communication section 36. However, by using the first device driver 175 and the second device driver 173, a burden to develop an emulation wireless driver can be reduced. Alternatively, only one of the first device driver 175 and the second device driver 173 may be used.

As will hereinafter be described in detail, the first wireless communication section 35 does not support the local communication as mentioned above. Therefore, the conversion program 3721 outputs a command for the local communication, without converting the command, to the second device driver 173, which command has been issued to the second device driver 173 by the game program for the purpose of controlling the second wireless communication section 36.

Further, in the present embodiment, from among subordinate model game programs which have already been released before the release of the superordinate model 10, only a game program, which has been confirmed to properly operate in the "emulator mode" using the emulation wireless driver 372, is stored in a region of the dual-purpose game program 174. However, all the subordinate model game programs may be operated in the "emulator mode". In this case, data of the dual-purpose game program 174 is not necessary. Further, the region of the dual-purpose game program 174 may be configured to be updatable via an external storage medium or a network. In such a case, a subordinate model game program which has been confirmed, after the release of the superordinate model 10, to operate properly in the "emulator mode", or a subordinate model game program which has been released after the release of the superordinate model 10, may be registered as an emulation support game program.

Next, with reference to FIGS. 7 to 10, processing assumed in the present embodiment will be briefly described. The present invention relates to a process which is performed in the case where the subordinate model card is inserted into the superordinate model 10, that is, a process which is performed in the case where a game created for the subordinate model 50 is executed by the superordinate model 10 having compatibility with the subordinate model 50.

Prior to describing the case where a game of the subordinate model card (hereinafter, referred to as a "subordinate model game") is executed by the superordinate model 10, a manner of executing the game by the subordinate model 50 will be described, that is, a case where the subordinate model game is executed by the subordinate model 50 will be described. Here, subordinate model games assumed in the present embodiment include a game in which a game process using a communication function is performed (hereinafter, referred to as a communication game) (to be more specific, a game in which a process for performing communication using the second wireless communication section 36 is performed). Communication methods used herein are the following two types of communication methods. One of the methods is called local communication in which a plurality of game machines are directly connected to each other without a server or the like by short-range wireless communication using faint radio waves. This type of communication method assumes, for example, a case where a plurality of players (i.e., a plurality of subordinate models 50) are in a small area such as a same room. The other method is called Wifi communication for mainly performing wireless communication conforming to IEEE 802.11. For example, in the Wifi communication, a connection to a predetermined server or to the subordinate model 50 of another player is established via, e.g. the Internet, whereby the communication is performed. This type of communication method mainly assumes a case where players each having the subordinate model 50 are remote from each other, or a game play using an internet connection. Note that, in the present embodiment, the local communication is performed using a proprietary protocol, and only devices each having the proprietary protocol mounted thereon are allowed to communicate with each other.

Figure 7:
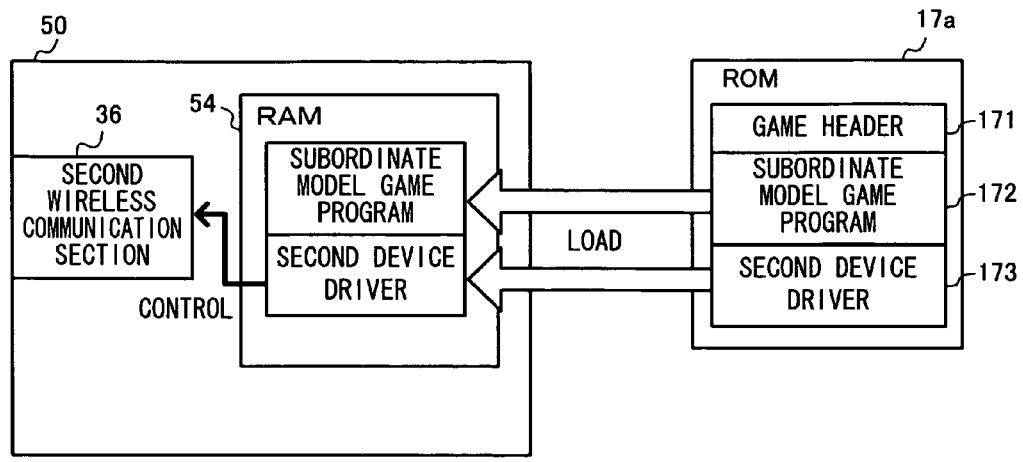
FIG. 7 briefly describes processing assumed in the present embodiment.

In the case where the above-described communication methods are used in the game executed by the subordinate model 50, the second wireless communication section 36 is used in the game process. In this case, a flow of the game process is as described below. First, at a boot process of the subordinate model 50 (i.e., at a process which is performed when the subordinate model 50 is turned on), the subordinate model game program 172 and the second device driver 173 are loaded from the memory card 17 to the RAM 54 of the subordinate model 50, as shown in FIG. 7. Then, the CPU core 51 starts performing the game process based on the subordinate model game program 172 loaded to the RAM 54. In the game process based on the subordinate model game program 172, a command to control the second wireless communication section is issued to the second device driver 173 which has been loaded into the RAM 54. It is assumed here that a command class of the command is different between the local communication and the Wifi communication. That is, the command for the local communication and the command for the Wifi communication are different from each other.

The second device driver 173 receives and interprets the command, and controls the second wireless communication section 36 in accordance with a content of the command. Then, a process to return a result of the above processing to the conventional game program is performed as necessary. In this manner, the subordinate model 50 executes the communication game.

Described next is a case where a subordinate model game, particularly a communication game, is executed by the superordinate model 10. As described above, the CPU core 21 of the superordinate model 10 has an execution mode which is compatible with the CPU core 51 of the subordinate model 50 (compatibility mode), and therefore, the subordinate model game can be executed by the CPU core 21. Further, as described above, the second wireless communication section 36, which is the same as that mounted on the subordinate model 50, is mounted on the superordinate model 10. For this reason, when the subordinate model game is executed by the superordinate model 10, a processing flow is as described below.

Figure 8:
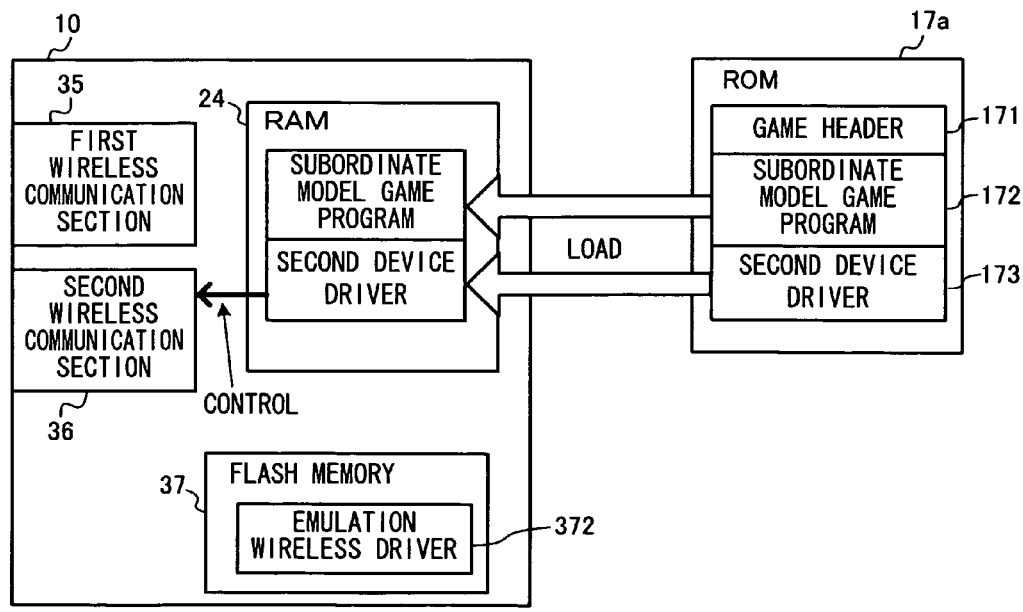
FIG. 8 briefly describes processing assumed in the present embodiment.

At a boot process of the superordinate model 10, the subordinate model game program 172 and the second device driver 173 are loaded from the memory card 17 (subordinate model card) into the RAM 24, as shown in FIG. 8. Next, the CPU core 21 performs a game process based on the subordinate model game program 172 which has been loaded into the RAM 24. In this game program, a command to control the second wireless communication section is issued to the second device driver 173 which has been loaded into the RAM 24. As a result, the second device driver 173 controls the second wireless communication section 36 in accordance with the command. Note that, the command has a specification and a command class intended for the second wireless communication section 36. Therefore, the command cannot control the first wireless communication section 35.

By performing the above processing, a communication process is performed by the superordinate model 10 using the second wireless communication section 36. Therefore, at least for the communication process in the above-described execution of the subordinate model game, the superordinate model 10 can be caused to perform the same process as that performed in the case where the subordinate model game is executed by the subordinate model 50.

Figure 9:
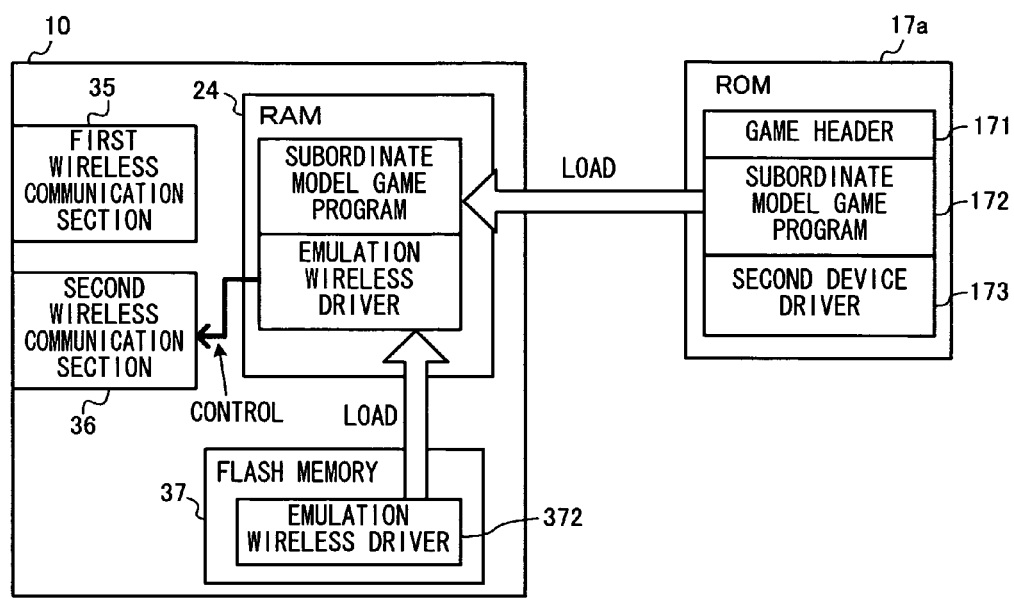
FIG. 9 briefly describes processing assumed in the present embodiment.

In the present embodiment, there is another operation mode in the case where the superordinate model 10 executes the game of the subordinate model card. In the present embodiment, the above-described operation mode, in which the second wireless communication section 36 is used to obtain compatibility, is referred to as a "normal mode", and an operation mode, in which a later-describe process is performed, is referred to as an "emulator mode" (FIG. 8 shows a case of "normal mode", and FIG. 9 shows a case of "emulator mode"). In the present embodiment, at the boot process, the superordinate model 10 performs a process for checking the game header 171, which is stored in the memory card 17 inserted into the superordinate model 10, against the emulation-support game list 371. Here, when the game header 171 indicates a game which is registered in the emulation-support game list 371, the superordinate model 10 automatically operates in the "emulator mode". When the game header 171 indicates a game which is not registered in the emulation-support game list 371, the superordinate model 10 operates in the "normal mode".

The "emulator mode" is an operation mode which allows not the second wireless communication section 36 but the first wireless communication section 35 having better performance to be used in the case where the game using the aforementioned communication function is executed and communication using the Wifi communication method is performed. In other words, the "emulator mode" is an operation mode which uses, when the superordinate model 10 performs the communication process, the first wireless communication section 35 while emulating the second wireless communication section 36.

When the subordinate model game is executed in the "emulator mode", a wireless driver, which is loaded into the RAM 24 when the superordinate model 10 performs the boot process, is different from that of the "normal mode". To be specific, as shown in FIG. 9, the subordinate model game program 172 is loaded from the memory card 17 (subordinate model card) to the RAM 24. However, the wireless driver loaded into the RAM 24 at the boot process is not the second device driver 173 of the memory card 17 but the emulation wireless driver 372 stored in the flash memory 37.

The emulation wireless driver 372 includes the conversion program 3721 as described above. Then, in the "emulator mode", the conversion program 3721 obtains, from among commands issued from the subordinate model game, a command related to communication (hereinafter, referred to as a "communication command"). Accordingly, a flow of the game process in the emulator mode is as described below.

First, when the above-described boot process is performed, the CPU core 21 starts performing the game process based on the subordinate model game program 172 which has been loaded into the RAM 24. When, in the game process, the communication command is issued (since the communication command is issued by the subordinate model game program 172, the communication command is, of course, a command for the second wireless communication section 36), this command is received by the emulation wireless driver 372, and then the conversion program 3721 is executed. The conversion program 3721 converts the command, i.e., the command for the second wireless communication section 36, to a command for the first wireless communication section. Then, the converted command is outputted to the first device driver 175 included in the emulation wireless driver 372. The first device driver 175 controls the first wireless communication section 35 in accordance with the converted command. Consequently, when the subordinate model game, which was not developed on the premise that the game is executed using the first wireless communication section 35, is executed, a process using the first wireless communication section 35 can be performed.

Figure 10:
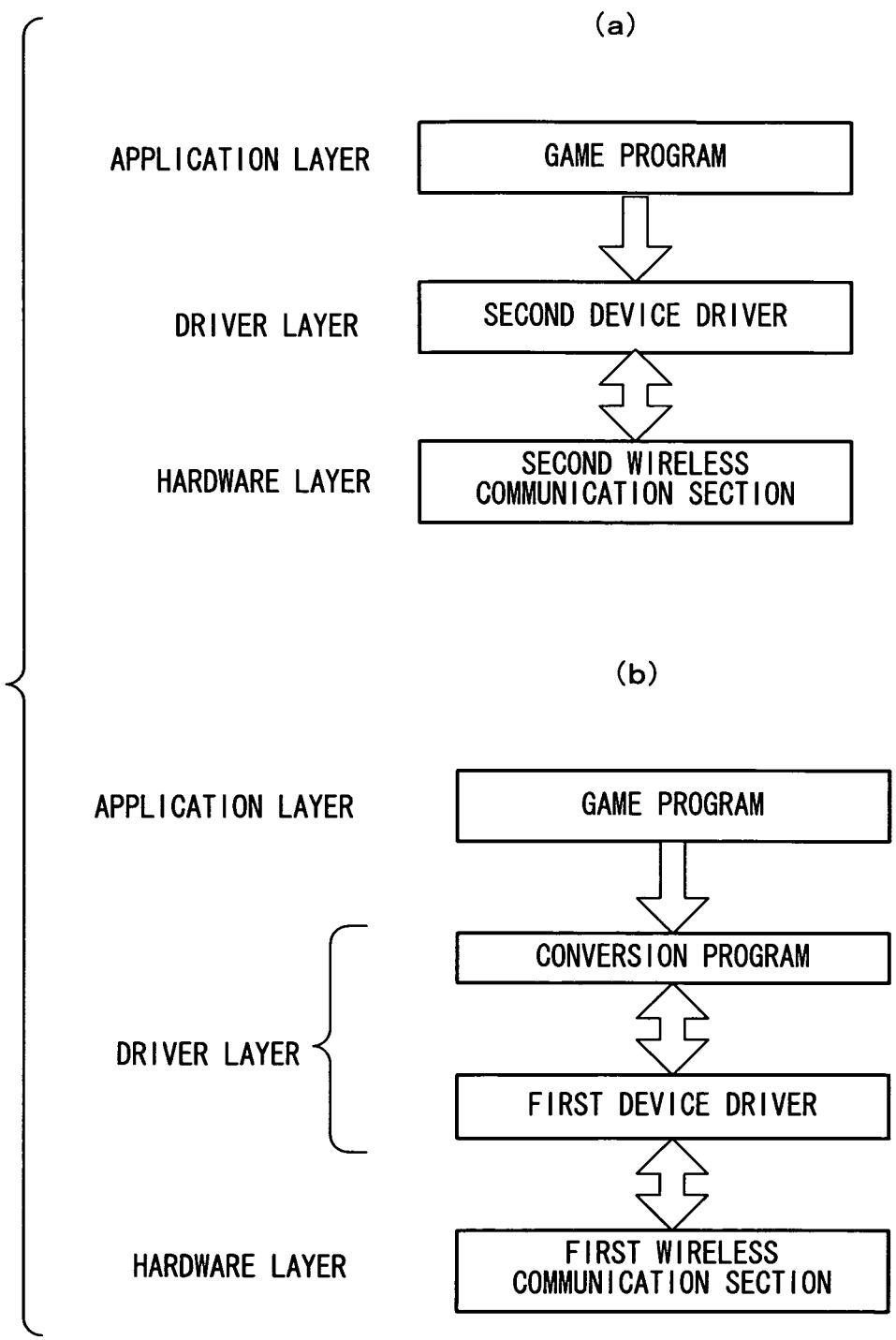
FIG. 10 briefly describes processing assumed in the present embodiment.

FIG. 10 shows a flow of device control in the case where the superordinate model 10 executes the subordinate model game in the "normal mode", and a flow of device control in the case where the superordinate model 10 executes the subordinate model game in the "emulator mode". As shown in FIG. 10(a), in the case of the "normal mode", the second device driver which is a driver layer receives a predetermined communication command (e.g., an API call) issued by the game program which is an application layer. Then, the second device driver accesses, based on the command, the second wireless communication section which is a hardware layer. On the other hand, in the case of the "emulator mode", as shown in FIG. 10(b), the predetermined communication command issued by the game program is received by the conversion program included in the emulation wireless driver. The conversion program then performs a process to convert the command as necessary, and the converted command is outputted to the first device driver included in the emulation wireless driver. Then, the first device driver accesses the first wireless communication section in accordance with the command.

Thus, when the subordinate model game is executed in the "emulator mode", applying the above conversion program to the communication command enables the first wireless communication section 35 to be used in the execution of the subordinate model game. As a result, for example, even when the subordinate model game is executed, the power saving function of the first wireless communication section 35 can be used. Accordingly, as compared to the case where the subordinate model game is executed in the "normal mode", power consumption can be reduced, and this allows a buttery to be long-lasting.

As described above, even in the "emulator mode", when the communication command issued by the game program is a command for the local communication, the command is outputted, without being converted, to the second device driver 173 included in the emulation wireless driver 372. However, in the case where the first wireless communication section 35 has a local communication function, even if the communication command issued by the game program is a command for the local communication, the command may be converted and then outputted to the first device driver 175 included in the emulation wireless driver 372. In such a case, it is not necessary to include the second device driver 173 in the emulation wireless driver 372.

Figure 11:
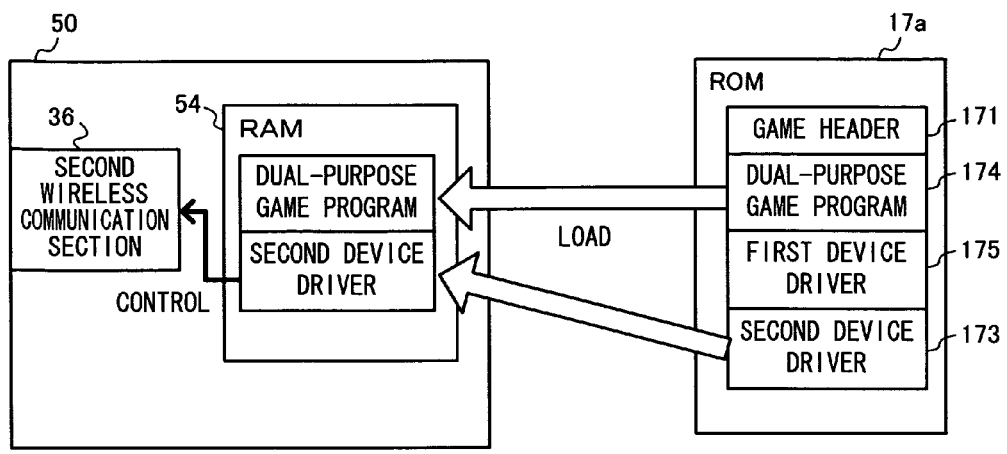
FIG. 11 briefly describes processing assumed in the present embodiment.

In the case where the above-described dual-purpose card is inserted into the subordinate model 50, the dual-purpose game program 174 and the second device driver 173 are loaded into the RAM 54 of the subordinate model 50, and then executed (see FIG. 11). On the other hand, in the case where the superordinate model card is inserted into the subordinate model 50, the game does not start. In other words, the game stored in the superordinate model card cannot be played using the subordinate model 50.

Figure 12:
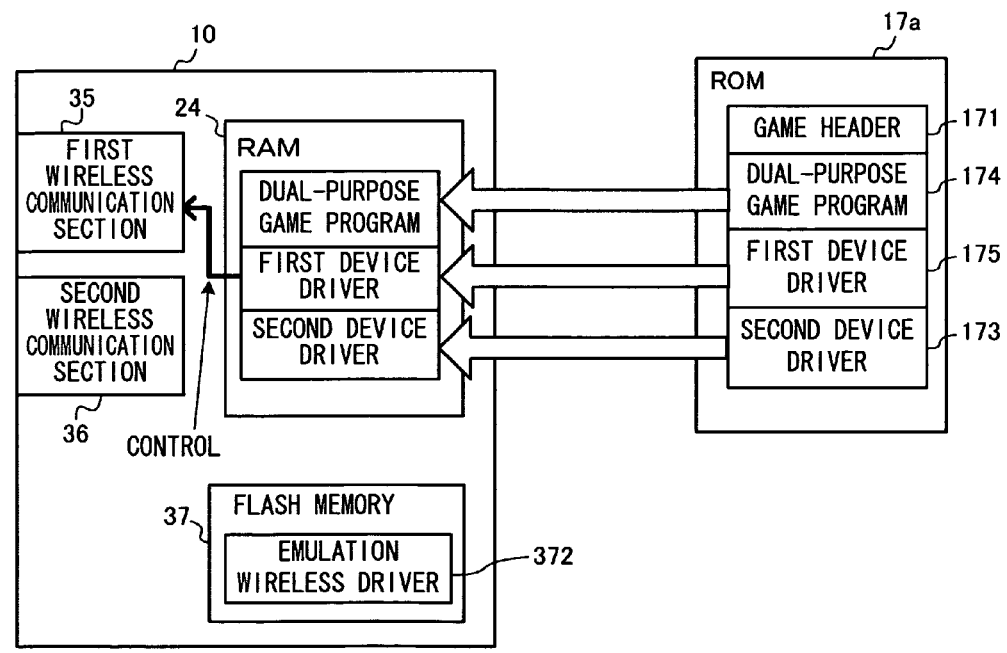
FIG. 12 briefly describes processing assumed in the present embodiment.
Figure 13:
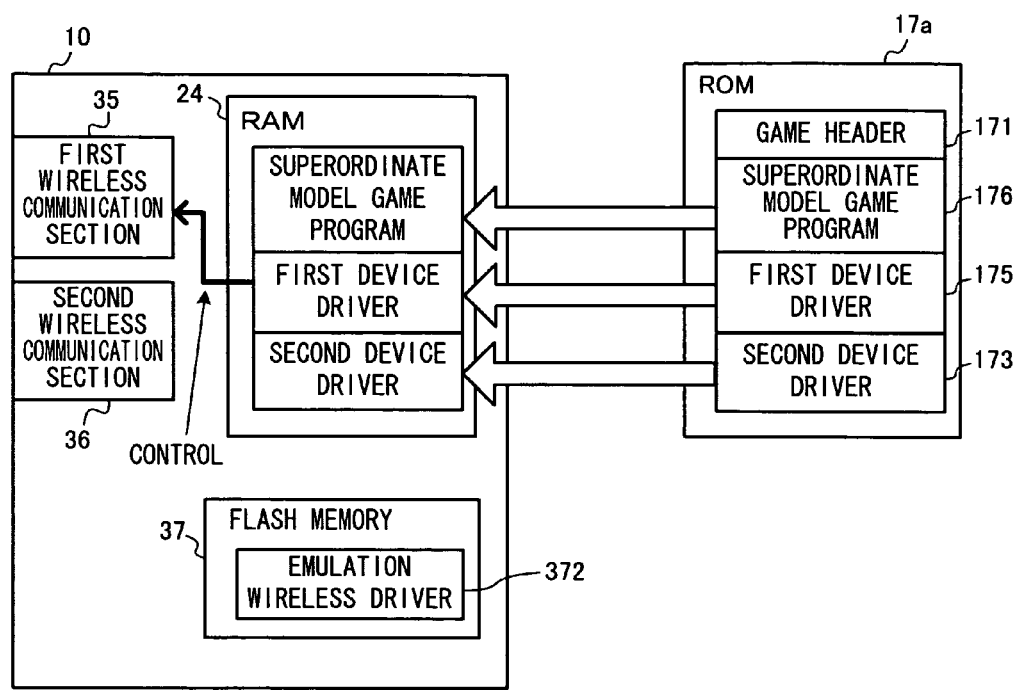
FIG. 13 briefly describes processing assumed in the present embodiment.

Further, in the case where the dual-purpose card is inserted into the superordinate model 10, the dual-purpose game program 174, the first device driver 175 and the second device driver 173 are loaded into the RAM 24 of the superordinate model 10, and then executed (see FIG. 12). In other words, when the game of the dual-purpose card is executed, the wireless drivers stored in the dual-purpose card are used for the execution of the subordinate model game. Further, in the case where the superordinate model card is inserted into the superordinate model 10, the superordinate model game program 176, the first device driver 175 and the second device driver 173 are loaded into the RAM 24, and then executed (see FIG. 13). Note that, as described above, in the case where the first wireless communication section 35 has the local communication function, it is not necessary to store the second device driver 173 in the superordinate model game program 176. In this case, it is understood that the second device driver 173 is not loaded.

Figure 14:
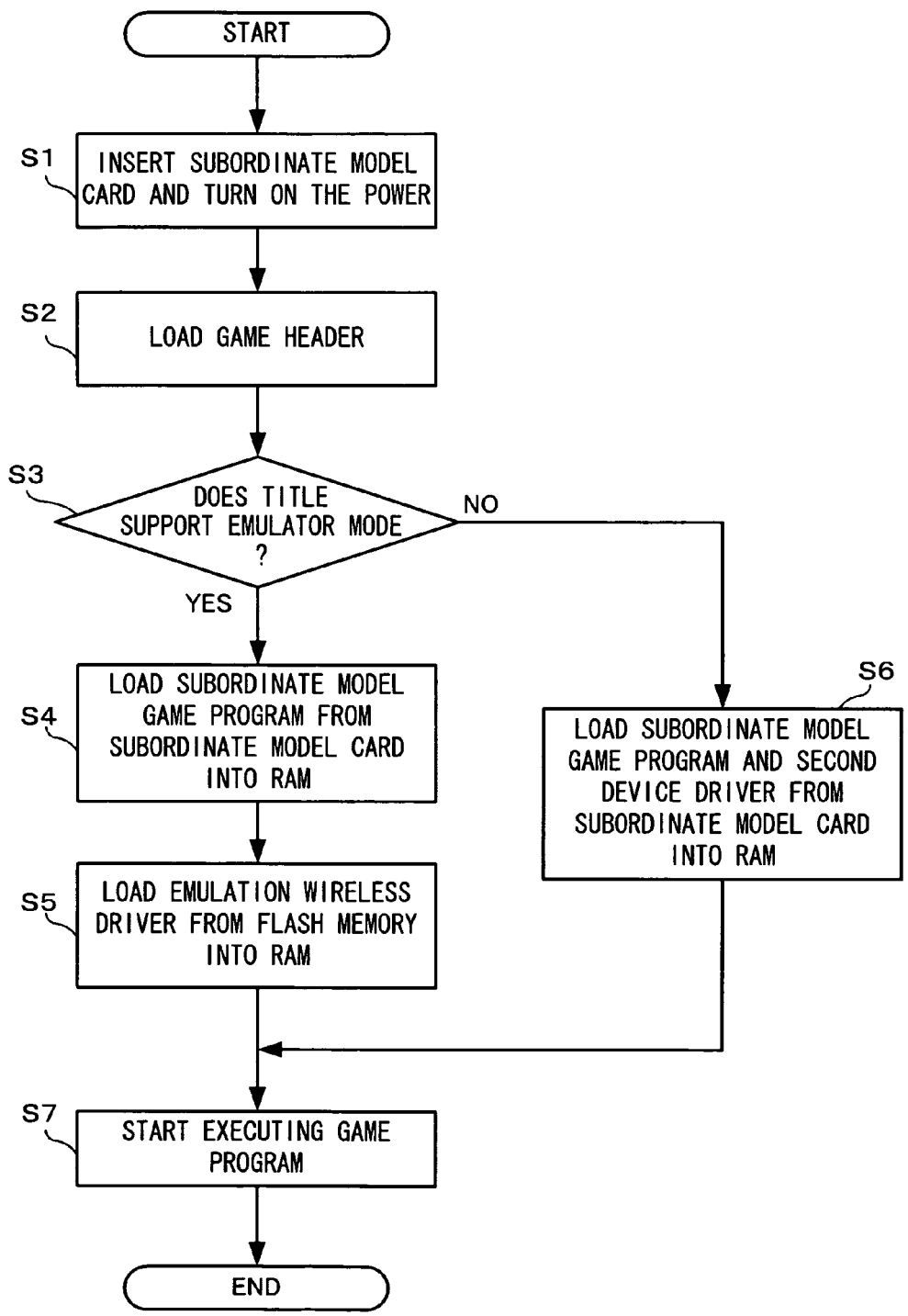
FIG. 14 is a flowchart showing a flow of a game start process of the superordinate model 10.

Hereinafter, processes, which are performed when the subordinate model card is inserted into the superordinate model 10, will be described in detail with reference to FIGS. 14 and 15. FIG. 14 is a flowchart showing a flow of a game boot process which is performed in accordance with a boot program (stored in a boot ROM, which is not shown, of the superordinate model 10) which is executed when the subordinate model card is inserted into the superordinate model 10 and the superordinate model 10 is turned on.

As shown in FIG. 14, when the subordinate model card is inserted and the superordinate model 10 power is turned on at step S1, the game header 171 is obtained at step S2 from the ROM 17a of the inserted memory card 17.

Next, at step S3, it is determined, based on the obtained game header 171, whether or not a game of the inserted card supports the emulator mode. To be specific, the emulation-support game list 371 of the flash memory 37 is referred to, and then it is determined whether or not the game header 171 obtained at step S2 is registered in the emulation-support game list 371.

When a result of the determination indicates that the game supports the emulator mode (YES at step S3), the subordinate model game program 172 is loaded from the ROM 17a into the RAM 24 at step S4. Subsequently, at step S5, the emulation wireless driver 372 is loaded into the RAM 24 from the flash memory 37.

Thereafter, at step S7, the subordinate model game program 172 having been loaded into the RAM 24 starts to be executed.

On the other hand, when the result of the determination at the above step S3 indicates that the game of the inserted card does not support the emulator mode (NO at step S3), the subordinate model game program 172 is loaded from the ROM 17a into the RAM 24 at step S6. Further, the second device driver 173 is loaded into the RAM 24 from the ROM 17a. Thereafter, the processing proceeds to the above-described step S7, and the subordinate model game program 172 starts to be executed.

Thus, in the game start process, it is determined whether or not the game supports operations to be performed in the emulator mode, and a process to change a wireless driver to be loaded into the RAM 24 is performed based on a result of the determination.

Figure 15:
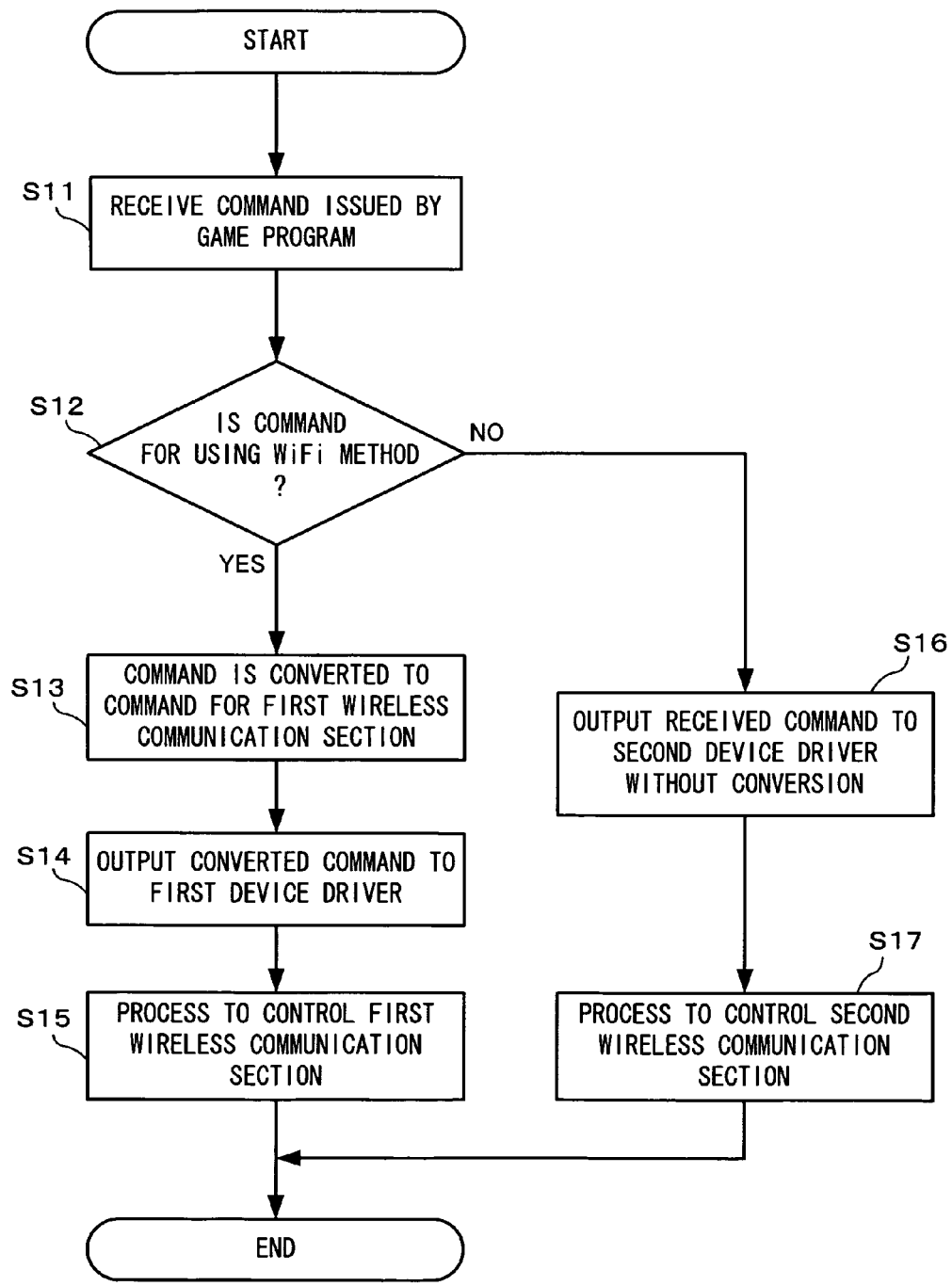
FIG. 15 is a flowchart showing a flow of a game process which is performed during an operation in an "emulator mode".

Described next with reference to FIG. 15 is a game process of the subordinate model game operated in the "emulator mode". Described herein is mainly a process which is performed by the emulation wireless driver of the subprocessor 39 when the communication command is issued from the CPU core 21 executing the subordinate model game program. Since a game process which is performed when the communication command is not issued is not directly relevant to the present invention, a description thereof will be omitted.

FIG. 15 is a flowchart showing the process which is performed by the emulation wireless driver 372 when the communication command is issued during the execution of the subordinate model game program 172. In particular, steps S11, S12, S13, S14 and S16 indicate processes based on the conversion program 3721. Further, step S15 indicates a process performed by the first device driver 175, and step S17 indicates a process performed by the second device driver 173. First, as shown in FIG. 15, the communication command issued during the execution of the subordinate model game program 172 is received at step S11. Note that, the communication command issued during the execution of the subordinate model game program 172 is a command for controlling the second wireless communication section.

Next, it is determined at step S12 whether the received command is a command to use the local communication method or a command to use the Wifi communication method. The reason for this is that in the present embodiment, the first and second wireless communication sections 35 and 36 are used in different manners from each other such that the first wireless communication section 35 is used only when the Wifi communication method is used as a communication method, and the second wireless communication section 36 is used only when the local communication method is used as a communication method. Further, as described above, in the present embodiment, the command for the local communication and the command for the Wifi communication are categorized in different command classes, and thus the command for the local communication and the command for the Wifi communication are different from each other. Accordingly, by determining an instruction code of the command, it can be determined whether the command is for the local communication or for the Wifi communication.

For example, when the instruction code is "Local_connect (argument)", the command is determined to be the command for the local communication, and when the instruction code is "WiFi_connect (argument)", the command is determined to be the command for the Wifi communication.

When a result of the determination indicates that the command is for using the Wifi communication method (YES at step S12), the command received at the above step S11 is converted to a command for the first wireless communication section 35 at step S13. In a subsequent step S14, the converted command is outputted to the first device driver 175. Thereafter, at step S15, the first wireless communication section 35 is controlled based on the converted command for the first wireless communication section 35.

On the other hand, when a result of the determination at the above step S12 indicates that the command is for using the local communication method (No at step S12), the command received at the above step S11 is outputted to the second device driver 173 at step S16. In other words, the command for the second wireless communication section 36 is outputted to the second device driver 173, without being converted in the above manner.

Then, at the following step S17, the second wireless communication section 36 is controlled based on the command for the second wireless communication section 36.

As described above, in the present embodiment, when the superordinate model 10 executes a game of the subordinate model 25 50 (i.e., conventional game), the super ordinate model 10 is able to use a function of the superordinate model 10 (i.e., the first wireless communication section 35 in the present embodiment), instead of a function of the subordinate model 50 (i.e., the second wireless communication section 36 in the present embodiment). As a result, the superordinate model 10 can realize amore comfortable game play by using the function of the superordinate model which was developed after the subordinate model, while maintaining the compatibility with the subordinate model.

The above embodiment gives a description of an exemplary case where if the game is an emulation-support game, the game is automatically operated in the "emulator mode". However, the present invention is not limited thereto. The present invention may be configured so as to allow the player to set whether or not to execute the emulation-support game in the "emulator mode". To be specific, the present invention may be configured so as to allow the player to select, when the superordinate model 10 executes the subordinate model game, whether to use the first wireless communication section or the second wireless communication section. In this case, the program for the boot process may include a function to set this selection, and in this function, the selection is performed based on an input by the player. A result of the selection may be stored in a predetermined region of the flash memory 37. Then, the processing may be performed such that before step S3 in the above-described boot process shown in FIG. 14, if data in the predetermined region indicates that "the first wireless communication section is to be used", the processing proceeds to step S3, and if the data indicates that "the second wireless communication section is to be used", the processing proceeds to step S6.

Further, in the above embodiment, software (integrally storing an application program and a driver program) is stored in the memory card. However, the present invention is not limited thereto. The software (integrally storing an application program and a driver program) may be stored in any manner as long as the software is executable on the information processing apparatuses. For example, the software (integrally storing an application program and a driver program) may be stored in a predetermined server, and may be downloaded to each information processing apparatus so as to be stored in storage means thereof.

Still further, in the above-described embodiment, the conversion program 3721 is used to convert the command issued for the second device (second wireless communication section) to the command for the first device (first wireless communication section), whereby the first device is controlled. However, the present invention is not limited to using the conversion program 3721. For example, the driver for controlling the first device may be configured so as to have compatibility which enables the driver to control the second device. Then, by storing the driver for controlling the first device in storage means of the first information processing apparatus, the present invention can be implemented without using the above-described conversion program.

Still further, in the above embodiment, the emulation driver program is configured so as to include the conversion program and the first device driver. However, the present invention is not limited thereto. The emulation driver program may be configured in any manner as long as the emulation driver program can be used to control the first device by using a command for controlling the second device. For example, the software may be configured so as to include the first device driver for controlling the first device, and only the conversion program, which converts a command for controlling the second device to a command which the first device driver can receive, may be stored in the first information processing apparatus as the emulation driver program. When the command for controlling the second device is issued, the command may be received by the first device driver included in the software, and the first device may be controlled using the first device driver.

Still further, the above embodiment describes a wireless function (first wireless communication section 35) as an example of a function of the superordinate model 10 which is used instead of a function of the subordinate model 50 when the superordinate model 10 executes a game of the subordinate model 50 (i.e., a conventional game). However, the function to be used instead is not limited thereto. The function to be used instead may be any function as long as the function of the superordinate model is configured so as to be substituted for a function of the subordinate model. For example, the present invention can be applied also in the case where a liquid crystal panel mounted on the superordinate model is greater, in resolution and the number of colors, than a liquid crystal panel of the subordinate model. Also, the present invention is useful in the case where the superordinate model has mounted therein same components (wireless chip and the like) as those of the subordinate model for the purpose of obtaining compatibility with the subordinate model, and although a fundamental function (i.e., a wireless communication function in the present embodiment) of the superordinate model is the same as that of the subordinate model, the superordinate model has additionally mounted therein a component which is greater in performance than that of the subordinate model.

Still further, the emulation-support game list 371 and the emulation wireless driver 372 stored in the flash memory 37 may be each configured such that upgrading thereof can be performed by downloading a latest version thereof from a predetermined server. For example, a driver upgrade program may be stored in the flash memory 37 in advance, and this program may perform a process to upgrade the emulation wireless driver 372 of the flash memory 37 by downloading the emulation wireless driver 372 of a latest version by communicating, using the first wireless communication section 35, with a predetermined server. As a result, upgrading of the emulation wireless driver 372 or the like enables a conventional game, which is originally inoperable in the "emulator mode", to be operated in the emulator mode. In other words, the number of emulation-support games can be increased.

Still further, the first device driver 175 stored in the dual-purpose card or in the superordinate model card may be the first device driver whose version is the latest when a game to be stored in these cards is developed. In other words, the wireless drivers to be stored in the memory card 17 each may be a driver whose version is the latest at the release of the memory card (game). As described above, when the dual-purpose game or the superordinate model game is executed by the superordinate model 10, the first device driver 175 stored in the memory card 17 is loaded into the RAM 24, and then used. For this reason, when these games are executed, a wireless driver of a newer version for the first wireless communication section can be used.

While the invention has been described in detail, the foregoing description is in all aspects illustrative and not restrictive. It is understood that numerous other modifications and variations can be devised without departing from the scope of the invention.

What is claimed is:

1. An information processing system, comprising:
a first information processing apparatus having a first device;
a second information processing apparatus being a subordinate model to the first information processing apparatus and having a second device different from the first device, the first information processing apparatus being a superordinate model to the second information processing apparatus;
first-device-using software including a first device driver program for controlling the first device and including a first-device-using application program which is created so as to issue a command receivable by the first device driver program and thereby control the first device; and
second-device-using software including a second device driver program for controlling the second device and including a second-device-using application program which is created so as to issue a command receivable by the second device driver program and thereby control the second device,
the first device and the second device having a same fundamental function, and the first device having another function that the second device does not have,
the first information processing apparatus configured to:
store, in advance, an emulation driver program which receives the command for controlling the second device and controls the first device, which command is issued based on the second-device-using application program; and
at an execution of the first-device-using application program included in the first-device-using software, receive, by using the first device driver program included in the first-device-using software, the command for controlling the first device, the command for controlling the first device is issued based on the first-device-using application program, and execute the first-device-using application program while controlling the first device by using the first device driver program, and at an execution of the second-device-using application program included in the second-device-using software, receive, by using the stored emulation driver program, the command for controlling the second device, the command for controlling the second device is issued based on the second-device-using application program, and execute the second-device-using application program while causing the emulation driver program to perform a control of the first device by utilizing the fundamental function, including at least a communication function, as well as a control of the first device by utilizing the other function, including at least a power saving function, the second-device-using application program executed by adapting the first device to operate as the second device, and
the second information processing apparatus configured to:
at an execution of the second-device-using application program included in the second-device-using software, receive, by using the second device driver program included in the second-device-using software, the command for controlling the second device, the command for controlling the second device is issued based on the second-device-using application program, and execute the second-device-using application program while control the second device by using the second device driver program, wherein
the first and second devices are communication devices for performing communication,
at least one of communication functions of the second device is unable to communicate with a communication function of the first device,
the first information processing apparatus further has the second device, and
at the execution of the second-device-using application program included in the second-device-using software, the second-device-using application program is executed while controlling the second device by using the second device driver program included in the second-device-using software.

2. The information processing system according to claim 1, further comprising selective software which includes a selective application program, the first device driver program and the second device driver program, the selective application program is created so as to allow a first process and a second process to be executed in a selective manner, the first process is for issuing the command, receivable by the first device driver program, for controlling the first device, and the second process is for issuing the command, receivable by the second device driver program, for controlling the second device, wherein
at an execution of the selective application program included in the selective software: the first device driver program included in the selective software is used such that the first process is selected from among the first and second processes; by using the first device driver program, the command for controlling the first device which is issued by the first process is received; and the selective application program is executed while controlling the first device by using the first device driver program, and
at an execution of the selective application program included in the selective software: the second device driver program included in the selective software is used such that the second process is selected from among the first and second processes; by using the second device driver program, the command for controlling the second device which is issued by the second process is received; and the selective application program is executed while controlling the second device by using the second device driver program.

3. The information processing system according to claim 1, wherein
the second device has a function in common with the first device, and
the function of the first device and the function of the second device differ in performance.

4. The information processing system according to claim 1, wherein the first information processing apparatus further configured to:
obtain an emulation driver upgrade program from a predetermined server via the first device; and
upgrade the stored emulation driver program by using the obtained emulation driver upgrade program.

5. The information processing system according to claim 1, wherein the emulation driver program converts the received command for controlling the second device to a command, receivable by the first device driver program, for controlling the first device, and controls the first device in accordance with the converted command.

6. The information processing system according to claim 1, wherein
the first and second information processing apparatuses are game apparatuses,
the first and second devices are wireless communication devices for performing wireless communication, and
the second-device-using application program is a game program for performing a game process using wireless communication by the second device.

7. The information processing system according to claim 6, wherein the first device consumes less power for wireless communication than the second device.

8. The information processing system according to claim 1, wherein
the first and second devices are wireless communication devices for performing wireless communication,
the second device has a first communication mode which allows direct communication between first information processing apparatuses or between second information processing apparatuses, and has a second communication mode for performing communication with a predetermined server, and
the second device is used when using the first communication mode, and the first device is used when using the second communication mode.

9. The information processing system according to claim 1, wherein the other function, including at least the power saving function, is executed without using the stored emulation driver program.

10. An information processing system comprising:
a first information processing apparatus having a first device;
a second information processing apparatus being a subordinate model to the first information processing apparatus and having a second device different from the first device, the first information processing apparatus being a superordinate model to the second information processing apparatus;
second-device-using software including a second device driver program for controlling the second device and including a second-device-using application program which is created so as to issue a command receivable by the second device driver program and thereby control the second device; and
selective software including a selective application program, a first device driver program and the second device driver program, the selective application program is created so as to allow a first process and a second process to be executed in a selective manner, the first process is for issuing a command, receivable by the first device driver program, for controlling the first device, and the second process is for issuing the command, receivable by the second device driver program, for controlling the second device,
the first device and the second device having a same fundamental function, and the first device having another function that the second device does not have,
the first information processing apparatus configured to:
store, in advance, an emulation driver program which receives the command for controlling the second device and controls the first device, which command is issued based on the second-device-using application program; and
at an execution of the second-device-using application program included in the second-device-using software, execute the second-device-using application program while causing the emulation driver program to perform a control of the first device by utilizing the fundamental function, including at least a communication function, as well as a control of the first device by utilizing the other function, including at least a power saving function, the second-device-using application program is executed by adapting the first device to operate as the second device, and at an execution of the selective application program included in the selective software, use the first device driver program included in the selective software such that the first process is selected from among the first and second processes, receive, by using the first device driver program, the command for controlling the first device which is issued by the first process, and execute the selective application program while control the first device by using the first device driver program,
the second information processing apparatus configured to:
at an execution of the second-device-using application program included in the second-device-using software, execute the second-device-using application program while control the second device by using the second device driver program included in the second-device-using software, and at an execution of the selective application program included in the selective software, use the second device driver program included in the selective software such that the second process is selected from among the first and second processes, receive, by using the second device driver program, the command for controlling the second device which is issued by the second process, and execute the selective application program while control the second device by using the second device driver program, wherein
the first and second devices are communication devices for performing communication,
at least one of communication functions of the second device is unable to communicate with a communication function of the first device,
the first information processing apparatus further has the second device, and
at the execution of the second-device-using application program included in the second-device-using software, the second-device-using application program is executed while controlling the second device by using the second device driver program included in the second-device-using software.

11. The information processing system according to claim 10, wherein
the second device has a function in common with the first device, and
the function of the first device and the function of the second device differ in performance.

12. The information processing system according to claim 10, wherein the first information processing apparatus further configured to:
obtain an emulation driver upgrade program from a predetermined server via the first device; and
upgrade the stored emulation driver program by using the obtained emulation driver upgrade program.

13. The information processing system according to claim 10, wherein the emulation driver program converts the received command for controlling the second device to a command, receivable by the first device driver program, for controlling the first device, and controls the first device in accordance with the converted command.

14. The information processing system according to claim 10, wherein
the first and second information processing apparatuses are game apparatuses,
the first and second devices are wireless communication devices for performing wireless communication, and
the second-device-using application program is a game program for performing a game process using wireless communication by the second device.

15. The information processing system according to claim 14, wherein the first device consumes less power for wireless communication than the second device.

16. The information processing system according to claim 10, wherein
the first and second devices are wireless communication devices for performing wireless communication,
the second device has a first communication mode which allows direct communication between first information processing apparatuses or between second information processing apparatuses, and has a second communication mode for performing communication with a predetermined server, and
the second device is used when using the first communication mode, and the first device is used when using the second communication mode.

17. A first information processing apparatus in an information processing system, the system comprising: the first information processing apparatus having a first device; a second information processing apparatus being a subordinate model to the first information processing apparatus and having a second device different from the first device, the first information processing apparatus being a superordinate model to the second information processing apparatus; and predetermined software including a driver program for controlling the second device and including an application program which is created so as to issue a command receivable by the driver program and thereby control the second device, the first device and the second device having a same fundamental function, and the first device having another function that the second device does not have, the first information processing apparatus configured to:
store, in advance, an emulation driver program for receiving an instruction to use the second device, which instruction is issued based on the application program, and controlling the first device; and
at an execution of the application program included in the predetermined software, receive, by using the stored emulation driver program, the command for controlling the second device, which command is issued based on the application program, and execute the application program while causing the emulation driver program to perform a control of the first device by utilizing the fundamental function, including at least a communication function, as well as a control of the first device by utilizing the other function, including at least a power saving function, the first device of the first information processing apparatus executing the application program by adapting the first device to operate as the second device, wherein
the first and second devices are communication devices for performing communication,
at least one of communication functions of the second device is unable to communicate with a communication function of the first device,
the first information processing apparatus further has the second device, and
at the execution of the application program, the application program is executed while controlling the second device by using the driver program.

18. A non-transitory computer-readable storage medium storing an emulation program configured to perform functionality comprising:
receiving a command from an application program which is created so as to issue the command receivable by a driver program for controlling a predetermined device and thereby control the predetermined device; and
converting the command to a command for a driver program for controlling a different device from the predetermined device, the predetermined device and the different device having a same fundamental function, and the predetermined device having another function that the different device does not have, wherein the application program is executed by adapting the predetermined device to operate as the different device, wherein
the predetermined device and the different device are communication devices for performing communication,
at least one of communication functions of the different device is unable to communicate with a communication function of the predetermined device, and
at the execution of the application program, the application program is executed while causing the driver program to perform a control of the predetermined device by utilizing the fundamental function, including at least a communication function, as well as a control of the predetermined device by utilizing the other function, including at least a power saving function.

19. A non-transitory computer-readable storage medium storing an emulation driver program to be executed by an information processing apparatus comprising a first device having at least a first function and a second device having the first function and a second function different from the first function, the first function being a same fundamental function, and the second function being a different function not present in the first device, the emulation driver program causing a processing system of the information processing apparatus to perform functionality comprising:
issuing a command receivable by a driver program for controlling the second device, and receiving a command from an application program which is created so as to control the second device,
when the received command is a first function control instruction to control the first function of the second device, converting the received first function control instruction to an instruction to control the first function of the first device, and controlling the first device in accordance with the converted instruction, the first device executing the converted instruction by adapting the first device to operate as the second device, and
when the received command is a second function control instruction to use the second function of the second device, controlling the second device in accordance with the second function control instruction, wherein
the first and second devices are communication devices for performing communication,
at least the first function of the second device is unable to communicate with the first function of the first device, and at the execution of the application program, the application program is executed while controlling the second device by using the driver program while causing the driver program to perform a control using the first function, including at least a communication function, as well as a control using the second function, including at least a power saving function.

20. An information processing system, comprising:
a first information processing apparatus having a first device;
a second information processing apparatus being a subordinate model to the first information processing apparatus and having a second device different from the first device, the first information processing apparatus being a superodinate model to the second information processing apparatus;
first-device-using software including a first device driver program for controlling the first device and including a first-device-using application program which is created so as to issue a command receivable by the first device driver program and thereby control the first device; and
second-device-using software including a second device driver program for controlling the second device and including a second-device-using application program which is created so as to issue a command receivable by the second device driver program and thereby control the second device,
the first device having a basic function common to the first device and the second device and a superodinate function of a performance higher than that of the second device,
the first information processing apparatus further configured to:
store, in advance, an emulation driver program which receives the command for controlling the second device and controls the first device, which command is issued based on the second-device-using application program; and
at an execution of the first-device-using application program included in the first-device-using software, receive, by using the first device driver program included in the first-device-using software, the command for controlling the first device, the command for controlling the first device is issued based on the first-device-using application program, and execute the first-device-using application program while control the first device by using the first device driver program, and at an execution of the second-device-using application program included in the second-device-using software, receive, by using the stored emulation driver program, the command for controlling the second device, the command for controlling the second device is issued based on the second-device-using application program, and execute the second-device-using application program while causing the emulation driver program to perform a control of the first device by utilizing the basic function, including at least a communication function, as well as a control of the first device by utilizing the superodinate function, including at least a power saving function, and
the second information processing apparatus further configured to:
at an execution of the second-device-using application program included in the second-device-using software, receive, by using the second device driver program included in the second-device-using software, the command for controlling the second device, the command for controlling the second device is issued based on the second-device-using application program, and execute the second-device-using application program while control the second device by using the second device driver program.

* * * * *